United States Patent
Ichi et al.

(10) Patent No.: US 12,314,022 B2
(45) Date of Patent: May 27, 2025

(54) POWER MANAGEMENT DEVICE, UPPER POWER MANAGEMENT DEVICE, AND POWER MANAGEMENT METHOD

(71) Applicant: TDK CORPORATION, Tokyo (JP)

(72) Inventors: Masao Ichi, Tokyo (JP); Shingo Suzuki, Tokyo (JP); Takuma Mitsunaga, Tokyo (JP); Katsuo Naoi, Tokyo (JP); Hisakazu Uto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 456 days.

(21) Appl. No.: 17/979,247

(22) Filed: Nov. 2, 2022

(65) Prior Publication Data

US 2023/0333529 A1    Oct. 19, 2023

(30) Foreign Application Priority Data

Apr. 14, 2022    (JP) .................................. 2022-067019

(51) Int. Cl.
   *G05B 19/042*    (2006.01)
   *H02J 3/32*    (2006.01)
   *H02J 3/38*    (2006.01)

(52) U.S. Cl.
   CPC .............. *G05B 19/042* (2013.01); *H02J 3/32* (2013.01); *H02J 3/381* (2013.01); *G05B 2219/2639* (2013.01); *H02J 2207/20* (2020.01); *H02J 2300/20* (2020.01)

(58) Field of Classification Search
   None
   See application file for complete search history.

(56) References Cited

U.S. PATENT DOCUMENTS

2010/0298991 A1*  11/2010  Alonso Sadaba ....... F03D 7/048
                                                                  700/276
2015/0263519 A1    9/2015  Suzuki

FOREIGN PATENT DOCUMENTS

JP    2015-177686 A    10/2015

* cited by examiner

*Primary Examiner* — Mohammad Ali
*Assistant Examiner* — Saad M Kabir
(74) *Attorney, Agent, or Firm* — Oliff PLC

(57) ABSTRACT

A power management device includes a control unit that controls a converter capable of bidirectionally converting between an external bus voltage and an internal bus voltage in a first power feeding system. When an amount of stored electric power of the first power feeding system is less than a first storage threshold value, the control unit sets a target value of the external bus voltage to a first power reception target value corresponding to a first transmission power value in a first power transmission request transmitted to an upper power management device. When the amount of stored electric power exceeds a second storage threshold value, the control unit sets the target value of the external bus voltage to a first power transmission target value corresponding to a second transmission power value in a second power transmission request received from a second power feeding system.

9 Claims, 11 Drawing Sheets

*Fig.5*

| TRANSMISSION POWER VALUE | POWER TRANSMISSION TARGET VALUE | POWER RECEPTION TARGET VALUE |
|---|---|---|
| 2500W (MAXIMUM POWER Wmax) | DC380V | DC340V |
| 2400W | DC370V | DC330V |
| 2300W | DC360V | DC320V |
| ⋮ | ⋮ | ⋮ |
| 1250W (INTERMEDIATE POWER Wmid) | DC330V | DC290V |
| ⋮ | ⋮ | ⋮ |

POWER MANAGEMENT DEVICE, UPPER POWER MANAGEMENT DEVICE, AND POWER MANAGEMENT METHOD

CROSS-REFERENCE TO RELATED APPLICATION

This application is based on Japanese Patent Application No. 2022-067019 filed with Japan Patent Office on Apr. 14, 2022 and claims the benefit of priority thereto. The entire contents of the application are incorporated herein by reference.

TECHNICAL FIELD

The present disclosure relates to a power management device, an upper power management device, and a power management method.

BACKGROUND

There is known a power interchange system in which electric power is interchanged between power supply grids that supply electric power using distributed power supplies. For example, Japanese Unexamined Patent Application Publication No. 2015-177686 describes a power interchange system including a plurality of power transmission/reception units and a virtual power transmission network construction device connected to the plurality of power transmission/reception units via a communication network. In this power interchange system, the virtual power transmission network construction device drafts a power interchange plan between power transmission/reception units, and a power transmission/reception unit on the power transmission side transmits electric power specified in the power interchange plan to a specified path for a specified period.

SUMMARY

Power transmission loss occurs when electric power is transmitted between power transmission/reception units (power feeding systems). In the present technical field, it is desired to suppress power transmission loss to improve power transmission efficiency.

The present disclosure describes a power management device, an upper power management device, a power management method, and a power management program capable of improving power transmission efficiency.

A power management device according to one aspect of the present disclosure includes: an acquisition unit that acquires an amount of stored electric power of a first power feeding system connected to a second power feeding system via an external direct current (DC) bus; a control unit that switches an operation mode of the first power feeding system by controlling a converter, the converter being capable of bidirectionally converting between an external bus voltage supplied to the external DC bus and an internal bus voltage supplied to an internal DC bus for supplying DC electric power in the first power feeding system; and a storage unit that stores a plurality of power reception target values which are target values of the external bus voltage in the converter when electric power is transmitted from the second power feeding system to the first power feeding system and a plurality of power transmission target values which are target values of the external bus voltage in the converter when electric power is transmitted from the first power feeding system to the second power feeding system.

The plurality of power reception target values are target values at which power transmission loss is minimized at different transmission power values. The plurality of power transmission target values are target values at which power transmission loss is minimized at different transmission power values. When the amount of stored electric power is less than a first storage threshold value, the control unit transmits a first power transmission request to an upper power management device that manages power transmission and reception between the first power feeding system and the second power feeding system, selects a first power reception target value corresponding to a first transmission power value in the first power transmission request from among the plurality of power reception target values, and sets the first power feeding system to a power reception mode by setting a target value of the external bus voltage to the first power reception target value. When the amount of stored electric power exceeds a second storage threshold value that is larger than the first storage threshold value and the control unit receives a second power transmission request from the second power feeding system via the upper power management device, the control unit selects a first power transmission target value corresponding to a second transmission power value in the second power transmission request from among the plurality of power transmission target values, and sets the first power feeding system to a power transmission mode by setting the target value of the external bus voltage to the first power transmission target value.

A power management method according to another aspect of the present disclosure includes: acquiring an amount of stored electric power of a first power feeding system connected to a second power feeding system via an external DC bus; transmitting a first power transmission request to an upper power management device that manages power transmission and reception between the first power feeding system and the second power feeding system when the amount of stored electric power is less than a first storage threshold value; setting the first power feeding system to a power reception mode when the amount of stored electric power is less than the first storage threshold value; and setting the first power feeding system to a power transmission mode when the amount of stored electric power exceeds a second storage threshold value that is larger than the first storage threshold value and a second power transmission request is received from the second power feeding system via the upper power management device. In setting the first power feeding system to the power reception mode, a first power reception target value corresponding to a first transmission power value in the first power transmission request is selected from among a plurality of power reception target values, and the first power feeding system is set to the power reception mode by setting a target value of an external bus voltage, which is supplied to the external DC bus, in a converter that is capable of bidirectionally converting between the external bus voltage and an internal bus voltage supplied to an internal DC bus for supplying DC electric power in the first power feeding system to the first power reception target value. In setting the first power feeding system to the power transmission mode, a first power transmission target value corresponding to a second transmission power value in the second power transmission request is selected from among a plurality of power transmission target values, and the first power feeding system is set to the power transmission mode by setting the target value of the external bus voltage in the converter to the first power transmission target value. The plurality of power reception target values are target values of the external bus voltage in the converter when electric power is transmitted from the second power feeding system to the first power feeding system, and are target values at which power transmission loss is minimized at different transmission power values. The plurality of power transmission target values are target values of the external bus voltage in the converter when electric power is transmitted from the first power feeding system to the second power feeding system, and are target values at which power transmission loss is minimized at different transmission power values.

A power management program according to still another aspect of the present disclosure is a program for causing a computer to execute: acquiring an amount of stored electric power of a first power feeding system connected to a second power feeding system via an external DC bus; transmitting a first power transmission request to an upper power management device that manages power transmission and reception between the first power feeding system and the second power feeding system when the amount of stored electric power is less than a first storage threshold value; setting the first power feeding system to a power reception mode when the amount of stored electric power is less than the first storage threshold value; and setting the first power feeding system to a power transmission mode when the amount of stored electric power exceeds a second storage threshold value that is larger than the first storage threshold value and a second power transmission request is received from the second power feeding system via the upper power management device. In setting the first power feeding system to the power reception mode, a first power reception target value corresponding to a first transmission power value in the first power transmission request is selected from among a plurality of power reception target values, and the first power feeding system is set to the power reception mode by setting a target value of an external bus voltage, which is supplied to the external DC bus, in a converter that is capable of bidirectionally converting between the external bus voltage and an internal bus voltage supplied to an internal DC bus for supplying DC electric power in the first power feeding system to the first power reception target value. In setting the first power feeding system to the power transmission mode, a first power transmission target value corresponding to a second transmission power value in the second power transmission request is selected from among a plurality of power transmission target values, and the first power feeding system is set to the power transmission mode by setting the target value of the external bus voltage in the converter to the first power transmission target value. The plurality of power reception target values are target values of the external bus voltage in the converter when electric power is transmitted from the second power feeding system to the first power feeding system, and are target values at which power transmission loss is minimized at different transmission power values. The plurality of power transmission target values are target values of the external bus voltage in the converter when electric power is transmitted from the first power feeding system to the second power feeding system, and are target values at which power transmission loss is minimized at different transmission power values.

In the power management device, the power management method, and the power management program, the operation mode of the first power feeding system is switched based on the amount of stored electric power of the first power feeding system. When the amount of stored electric power of the first power feeding system is less than the first storage threshold value, the first power reception target value corresponding to the first transmission power value in the first power transmission request is selected from among the plurality of power reception target values, the target value of the external bus voltage in the converter of the first power feeding system is set to the first power reception target value, and the first power feeding system is set to the power reception mode. At this time, assuming that similar control is performed in the second power feeding system and that the second power feeding system is set to the power transmission mode, the power transmission target value corresponding to the first transmission power value is selected from among the plurality of power transmission target values in the second power feeding system, and the target value of the external bus voltage in the converter of the second power feeding system is set to the power transmission target value. Thus, the power transmission target value at which the power transmission loss at the first transmission power value is minimized is set in the converter of the second power feeding system, and the first power reception target value at which the power transmission loss at the first transmission power value is minimized is set in the converter of the first power feeding system. Therefore, power transmission loss in power transmission from the second power feeding system to the first power feeding system can be suppressed. By the similar control, when the first power feeding system is in the power transmission mode, the first power transmission target value at which the power transmission loss at the second transmission power value is minimized is set in the converter of the first power feeding system, and the power reception target value at which the power transmission loss at the second transmission power value is minimized is set in the converter of the second power feeding system. Therefore, power transmission loss in power transmission from the first power feeding system to the second power feeding system can be suppressed. As described above, the power transmission efficiency between the first power feeding system and the second power feeding system can be improved.

In some embodiments, the control unit may select a second power reception target value corresponding to a third transmission power value from among the plurality of power reception target values in response to a change request for changing the first transmission power value to the third transmission power value occurring in a state in which the first power feeding system is set to the power reception mode, and may set the target value of the external bus voltage to the second power reception target value. According to this configuration, even if the transmission power value is changed, the second power reception target value at which the transmission loss at the changed transmission power value (third transmission power value) is minimized is set in the converter of the first power feeding system. Assuming that similar control is performed in the second power feeding system, a power transmission target value at which the power transmission loss at the changed transmission power value (third transmission power value) is minimized is set in the converter of the second power feeding system. Therefore, even if the transmission power value is changed, the power transmission loss in the power transmission from the second power feeding system to the first power feeding system can be suppressed, so that the power transmission efficiency can be improved.

In some embodiments, the control unit may select a second power transmission target value corresponding to a fourth transmission power value from among the plurality of power transmission target values in response to a change request for changing the second transmission power value to the fourth transmission power value occurring in a state in which the first power feeding system is set to the power transmission mode, and may set the target value of the external bus voltage to the second power transmission target value. According to this configuration, even if the transmission power value is changed, the second transmission target value at which the power transmission loss at the changed transmission power value (fourth transmission power value) is minimized is set in the converter of the first power feeding system. Assuming that similar control is performed in the second power feeding system, a power reception target value at which the power transmission loss at the changed transmission power value (fourth transmission power value) is minimized is set in the converter of the second power feeding system. Therefore, even if the transmission power value is changed, the power transmission loss in the power transmission from the first power feeding system to the second power feeding system can be suppressed, so that the power transmission efficiency can be improved.

In some embodiments, the control unit may reset the power reception mode in response to the amount of stored electric power exceeding a first stop threshold value that is smaller than the second storage threshold value and larger than the first storage threshold value in a state in which the first power feeding system is set to the power reception mode. According to this configuration, the power reception mode can be reset before the first power feeding system receives excessive electric power. This makes it possible to receive electric power from the second power feeding system to the extent that the first power feeding system does not receive electric power more than necessary.

In some embodiments, the control unit may reset the power transmission mode in response to the amount of stored electric power being less than a second stop threshold value that is smaller than the second storage threshold value and larger than the first storage threshold value in a state in which the first power feeding system is set to the power transmission mode. According to this configuration, the power transmission mode can be reset before the amount of stored electric power of the first power feeding system becomes insufficient. This makes it possible to transmit electric power to the second power feeding system to the extent that the amount of stored electric power of the first power feeding system is not insufficient.

An upper power management device according to still another aspect of the present disclosure is a device that controls power transmission and reception between a first power feeding system and a second power feeding system that transmit and receive electric power to and from each other via an external DC bus. The upper power management device includes: a determination unit that determines a first target value of an external bus voltage, which is supplied to the external DC bus, in a first converter and a second target value of the external bus voltage in a second converter, the first converter being capable of bidirectionally converting between the external bus voltage and a first internal bus voltage supplied to a first internal DC bus for supplying DC electric power in the first power feeding system, the second converter being capable of bidirectionally converting between the external bus voltage and a second internal bus voltage supplied to a second internal DC bus for supplying DC electric power in the second power feeding system; an output unit that outputs a first setting command for setting the first target value in the first converter and a second setting command for setting the second target value in the second converter; and a storage unit that stores a first combination group including a plurality of combinations of a power transmission target value and a power reception target value at which power transmission loss is minimized at different transmission power values. When the determination unit receives a first power transmission request from the first power feeding system, the determination unit selects a first combination corresponding to a first transmission power value in the first power transmission request from the first combination group, determines a power reception target value included in the first combination as the first target value, and determines a power transmission target value included in the first combination as the second target value.

In the upper power management device, the first combination corresponding to the first transmission power value in the first transmission request is selected from the first combination group, the power reception target value included in the first combination is determined as the first target value of the external bus voltage in the first converter of the first power feeding system, and the power transmission target value included in the first combination is determined as the second target value of the external bus voltage in the second converter of the second power feeding system. Accordingly, the power reception target value of the first combination at which the power transmission loss at the first transmission power value is minimized is set in the first converter, and the power transmission target value of the first combination at which the power transmission loss at the first transmission power value is minimized is set in the second converter. Therefore, the power transmission loss in the power transmission from the second power feeding system to the first power feeding system can be suppressed. As a result, the power transmission efficiency between the first power feeding system and the second power feeding system can be improved.

In some embodiments, when the determination unit receives a second power transmission request from the second power feeding system, the determination unit may select a second combination corresponding to a second transmission power value in the second power transmission request from the first combination group, may determine a power reception target value included in the second combination as the second target value, and may determine a power transmission target value included in the second combination as the first target value. According to this configuration, the first combination group is commonly used for the case where electric power is transmitted from the first power feeding system to the second power feeding system and the case where electric power is transmitted from the second power feeding system to the first power feeding system. Therefore, since only one combination group is prepared, the configuration of the upper power management device can be simplified.

In some embodiments, the first combination group may include a plurality of combinations of a power transmission target value and a power reception target value at which power transmission loss is minimized at different transmission power values when electric power is transmitted from the second power feeding system to the first power feeding system. The storage unit may further store a second combination group including a plurality of combinations of a power transmission target value and a power reception target value at which power transmission loss is minimized at different transmission power values when electric power is transmitted from the first power feeding system to the second power feeding system. When the determination unit receives a second power transmission request from the second power feeding system, the determination unit may select a second combination corresponding to a second transmission power value in the second power transmission request from the second combination group, may determine a power reception target value included in the second combination as the second target value, and may determine a power transmission target value included in the second combination as the first target value. According to this configuration, the combination group used for the case where electric power is transmitted from the first power feeding system to the second power feeding system is different from the combination group used for the case where electric power is transmitted from the second power feeding system to the first power feeding system. Therefore, for example, even when the characteristics of the first converter are different from those of the second converter, the power transmission loss can be suppressed and the power transmission efficiency can be improved.

According to each aspect and each embodiment of the present disclosure, power transmission efficiency can be improved.

BRIEF DESCRIPTION OF THE DRAWINGS

FIG. 5 is a diagram showing an example of a plurality of combinations of a power reception target value and a power transmission target value.

DETAILED DESCRIPTION

Embodiments of the present disclosure will be described in detail with reference to the drawings. It should be noted that in the description of the drawings, the same elements are designated with the same reference signs, and the redundant description is omitted.

Figure 1:
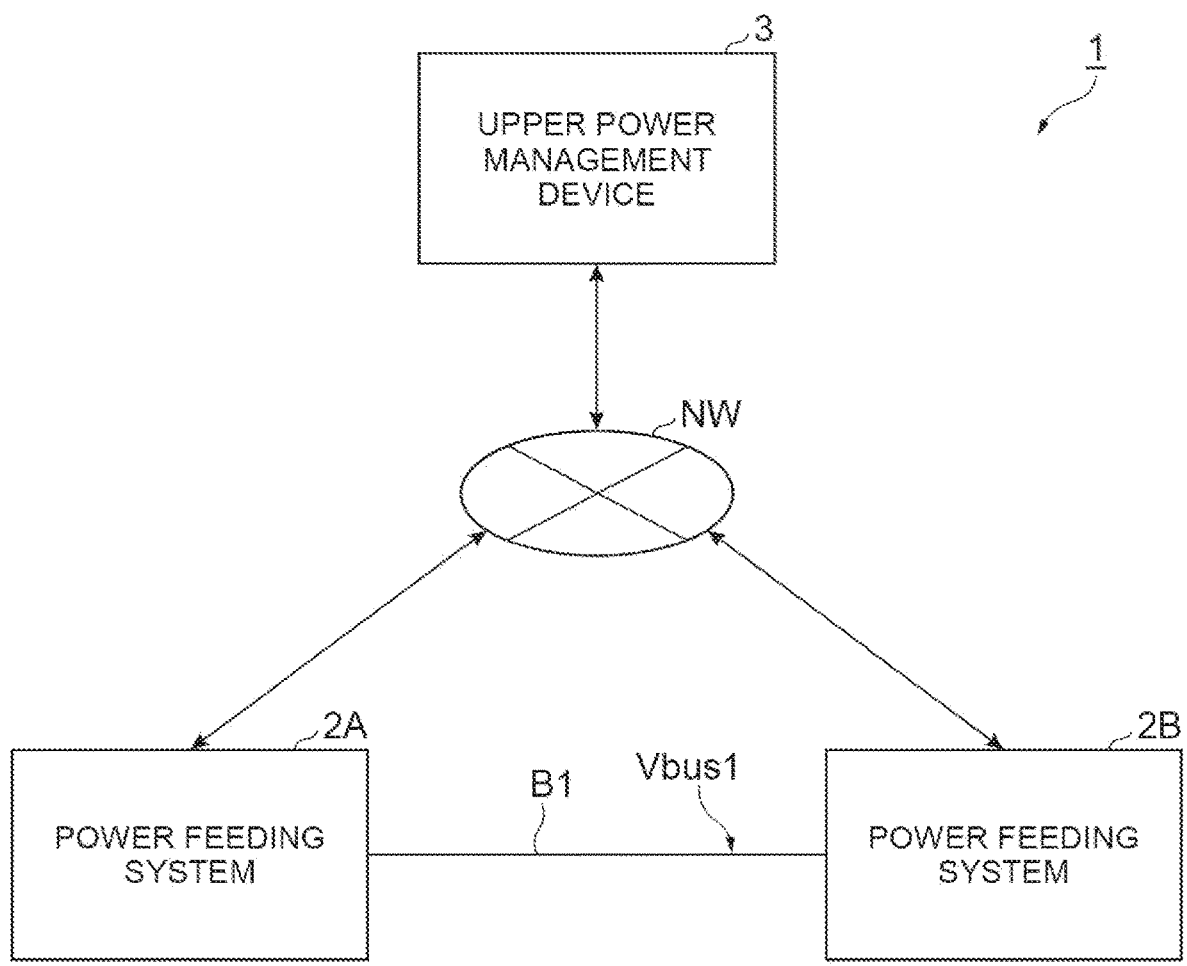
FIG. 1 is a configuration diagram schematically showing a power interchange system including an upper power management device according to an embodiment.

A power interchange system including an upper power management device according to an embodiment will be described with reference to FIG. 1. FIG. 1 is a configuration diagram schematically showing a power interchange system including an upper power management device according to an embodiment. A power interchange system 1 shown in FIG. 1 is a system for mutually supplying direct current (DC) electric power (performing power interchange) between a power feeding system 2A (first power feeding system) and a power feeding system 2B (second power feeding system). Hereinafter, supplying DC electric power may be referred to as "power transmission", receiving DC electric power may be referred to as "power reception", and these may be collectively referred to as "power transmission/reception" or "power interchange". The power interchange system 1 includes the power feeding system 2A, the power feeding system 2B, an upper power management device 3, and an external DC bus B1.

The power feeding system 2A and the power feeding system 2B are connected to each other via the external DC bus B1. In this case, one of the power feeding system 2A and the power feeding system 2B supplies electric power to the other. For example, when the amount of electric power stored in the power feeding system 2A (the amount of stored electric power will be described later) is excessive and the amount of electric power stored in the power feeding system 2B is insufficient, the power feeding system 2A supplies electric power to the power feeding system 2B via the external DC bus B1. Details of the power feeding systems 2A and 2B will be described later.

The external DC bus B1 is a bus that functions as a bus line for supplying DC electric power between the power feeding system 2A and the power feeding system 2B. An external bus voltage Vbus1 is supplied to the external DC bus B1. The external bus voltage Vbus1 is a high DC voltage. The external bus voltage Vbus1 is, for example, a voltage of DC 350 V or more and DC 410 V or less. The voltage value of the external bus voltage Vbus1 is set by the power feeding system 2A or the power feeding system 2B.

The upper power management device 3 is a device for controlling power interchange between the power feeding system 2A and the power feeding system 2B. The upper power management device 3 is connected to the power feeding system 2A and the power feeding system 2B via a communication network NW so as to be able to communicate with each other. The communication network NW may be constituted by either wired or wireless. Examples of the communication network NW include the Internet, a Wide Area Network (WAN), and a mobile communication network. The upper power management device 3 may be constituted by a single computer 100 (see FIG. 3) similar to a power management device 10 described later. The upper power management device 3 may be constituted by a plurality of computers 100 such as cloud computing.

Figure 2:
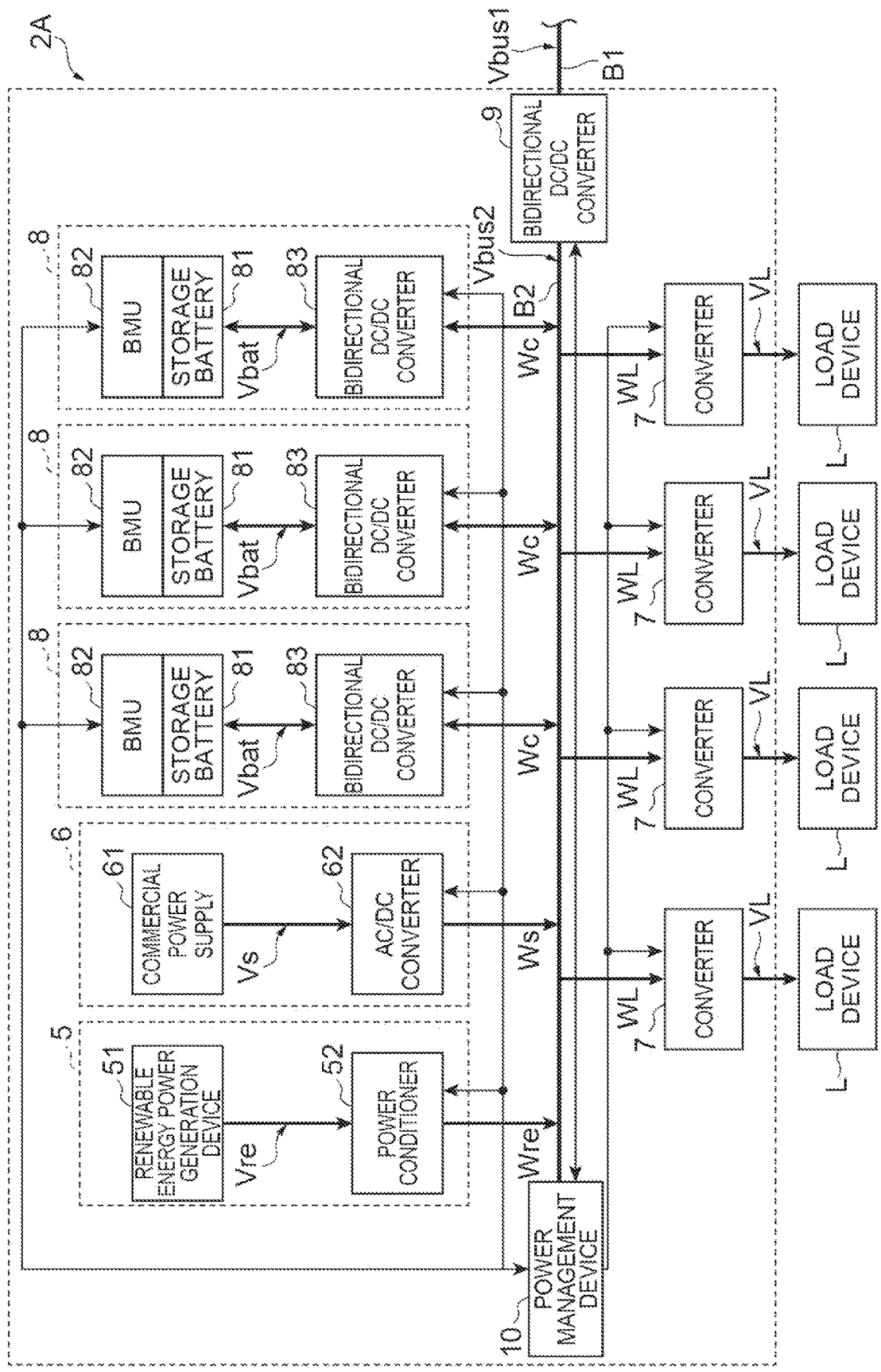
FIG. 2 is a configuration diagram schematically showing the power feeding system shown in FIG. 1.

Next, the power feeding systems 2A and 2B will be described with reference to FIG. 2. FIG. 2 is a configuration diagram schematically showing the power feeding system shown in FIG. 1. Since the power feeding system 2B has the configuration similar to that of the power feeding system 2A, only the power feeding system 2A will be described here. As shown in FIG. 2, the power feeding system 2A is a system that supplies load power WL (load voltage VL) to load devices L. In the present embodiment, the power feeding system 2A is a DC power feeding system. The load device L may be a DC load device that operates with a DC voltage or an alternating current (AC) load device that operates with an AC voltage. Examples of DC load devices include light emission diode (LED) illuminators, DC fans, televisions, and personal computers. Examples of AC load devices include washing machines, refrigerators, and air conditioners. The power feeding system 2A and the power feeding system 2B supply electric power to each other (perform power interchange) via the external DC bus B1.

The power feeding system 2A includes an internal DC bus B2, a power supply device 5, an auxiliary power supply device 6, converters 7, power storage devices 8, a bidirectional DC/DC converter 9, and the power management device 10.

The internal DC bus B2 is a bus that functions as a bus line for performing DC power supply for supplying DC electric power within the power feeding system 2A. The internal DC bus B2 is laid across the installation locations of the power supply device 5, the auxiliary power supply device 6, the converters 7, and the power storage devices 8. An internal bus voltage Vbus2 is supplied to the internal DC bus B2. The internal bus voltage Vbus2 is a high DC voltage. The internal bus voltage Vbus2 is set to be included in the range of the input voltage of the converter 7. The internal bus voltage Vbus2 is, for example, a voltage equal to or higher than DC 240 V and equal to or lower than DC 300 V. The value of the internal bus voltage Vbus2 may be fixed or variable. It should be noted that the values of the external bus voltage Vbus1 and the internal bus voltage Vbus2 are not limited to those described above. The value of the external bus voltage Vbus1 may be the same as the value of the internal bus voltage Vbus2, or the value of the internal bus voltage Vbus2 may be larger than the value of the external bus voltage Vbus1.

The power supply device 5 is a device that supplies electric power to the internal DC bus B2. In the present embodiment, the power feeding system 2A includes one power supply device 5. The number of power supply devices 5 is not limited to one, and may be appropriately changed as necessary. The power supply device 5 includes a renewable energy power generation device 51 and a power conditioner 52.

The renewable energy power generation device 51 is a device that generates generated power Wre. Examples of the renewable energy power generation device 51 include a photovoltaic power generation device, a wind power generation device, a hydroelectric power generation device, and a geothermal power generation device. The renewable energy power generation device 51 is connected to the internal DC bus B2 via the power conditioner 52. The renewable energy power generation device 51 generates a power generation voltage Vre having a predetermined voltage value, and outputs the generated power Wre corresponding to the power generation voltage Vre. The power generation voltage Vre may be a DC voltage or an AC voltage.

The power conditioner 52 is connected to the internal DC bus B2, and is a device that converts the power generation voltage Vre into the internal bus voltage Vbus2. The power conditioner 52 is provided between the renewable energy power generation device 51 and the internal DC bus B2. When the power generation voltage Vre is a DC voltage, the power conditioner 52 includes a DC/DC converter. When the power generation voltage Vre is an AC voltage, the power conditioner 52 includes an AC/DC converter. The power conditioner 52 operates with, for example, a DC voltage internally generated based on the internal bus voltage Vbus2. The power conditioner 52 controls the generated power Wre by controlling the power generation operation of the renewable energy power generation device 51 based on a command from the power management device 10.

When the power conditioner 52 receives a start command from the power management device 10, the power conditioner 52 converts the power generation voltage Vre into the internal bus voltage Vbus2 and supplies the internal bus voltage Vbus2 to the internal DC bus B2, thereby supplying the generated power Wre to the internal DC bus B2. When the power conditioner 52 receives a stop command from the power management device 10, the power conditioner 52 stops supplying the generated power Wre.

The power conditioner 52 has a power measurement function of measuring the generated power Wre supplied from the renewable energy power generation device 51 to the internal DC bus B2. The power conditioner 52 periodically measures the generated power Wre, for example. The power conditioner 52 transmits the measured value of the generated power Wre to the power management device 10.

The auxiliary power supply device 6 is a device that supplies electric power to the internal DC bus B2. The auxiliary power supply device 6 includes a commercial power supply 61 and an AC/DC converter 62. The commercial power supply 61 supplies system power Ws including a system voltage Vs. The system voltage Vs is an AC voltage. The commercial power supply 61 is connected to the internal DC bus B2 via the AC/DC converter 62.

The AC/DC converter 62 is connected to the internal DC bus B2, and is a device that converts the system voltage Vs into the internal bus voltage Vbus2. The AC/DC converter 62 is provided between the commercial power supply 61 and the internal DC bus B2. The AC/DC converter 62 operates with, for example, a DC voltage internally generated based on the system voltage Vs. When the AC/DC converter 62 receives a start command from the power management device 10, the AC/DC converter 62 converts the system voltage Vs into the internal bus voltage Vbus2 and supplies the internal bus voltage Vbus2 to the internal DC bus B2, thereby supplying the system power Ws to the internal DC bus B2. When the AC/DC converter 62 receives a stop command from the power management device 10, the AC/DC converter 62 stops supplying the system power Ws.

The AC/DC converter 62 has a power measurement function of measuring the system power Ws supplied from the commercial power supply 61 to the internal DC bus B2. The AC/DC converter 62 periodically measures the system power Ws, for example. The AC/DC converter 62 transmits the measured value of the system power Ws to the power management device 10.

Since the auxiliary power supply device 6 can stably supply electric power, the auxiliary power supply device 6 is controlled so as to supply electric power when the electric power of the entire power feeding system 2A is insufficient. In order to maintain the power feeding system 2A, the system power Ws is equal to or greater than the sum of the total load power WL and the standby power in the power feeding system 2A. The standby power includes power consumption of the power management device 10 and power consumption of auxiliary devices (relays, fans, and small-capacity power supplies, not shown).

The converter 7 is connected to the internal DC bus B2, and is a device that converts the internal bus voltage Vbus2 into a load voltage VL. The load voltage VL is a voltage supplied to the load device L. The load device L is connected to the internal DC bus B2 via the converter 7. The converter 7 operates with, for example, a DC voltage internally generated based on the internal bus voltage Vbus2. In the present embodiment, the power feeding system 2A includes four converters 7. The number of converters 7 is not limited to four, and may be changed in accordance with the number of load devices L.

When the converter 7 receives a start command from the power management device 10, the converter 7 converts the internal bus voltage Vbus2 into the load voltage VL, and supplies the load voltage VL (load power WL) to the load device L. When the load device L is a DC load device, the load voltage VL is a DC voltage, and the converter 7 is a DC/DC converter. For example, the converter 7 converts the internal bus voltage Vbus2 of DC 270 V into the load voltage VL of DC 24 V. When the load device L is an AC load device, the load voltage VL is an AC voltage, and the converter 7 is a DC/AC converter. When the converter 7 receives a stop command from the power management device 10, the converter 7 stops supplying the load voltage VL (load power WL).

The converter 7 has a current limiting function of limiting a current value of a load current supplied from the internal DC bus B2 to the load device L to an upper limit current value. The upper limit current value is set by the power management device 10. The converter 7 has a power measurement function of measuring the load power WL supplied from the internal DC bus B2 to the load device L based on the load voltage VL and the load current. The converter 7 periodically measures the load power WL, for example. The converter 7 transmits the measured value of the load power WL to the power management device 10.

The power storage device 8 is a device for storing surplus electric power that occurs in the power feeding system 2A and supplying deficient electric power that occurs in the power feeding system 2A. When the difference power obtained by subtracting the sum of the load power WL from the sum of the supply power is larger than 0, surplus electric power equal to the magnitude (power value) of the difference power occurs. The supply power is electric power supplied to the internal DC bus B2. In the present embodiment, the supply power is the generated power Wre, and the system power Ws. To each power storage device 8, for example, power Wc obtained by equally dividing surplus electric power by the number of power storage devices 8 is supplied from the internal DC bus B2. When the difference power is less than 0, deficient electric power equal to the magnitude of the difference power occurs. From each power storage device 8, for example, power We obtained by equally dividing the deficient electric power by the number of power storage devices 8 is released to the internal DC bus B2.

The number of power storage devices 8 is not limited to three, and may be appropriately changed as necessary. Each of the power storage devices 8 includes a storage battery 81, a battery management unit (BMU) 82, and a bidirectional DC/DC converter 83.

The storage battery 81 is a chargeable and dischargeable device. The storage battery 81 is connected to the internal DC bus B2 via the bidirectional DC/DC converter 83. Examples of the storage battery 81 include a lithium ion battery, a sodium-sulfur (NAS) battery, a redox flow battery, a lead acid battery, and a nickel metal hydride battery. In the present embodiment, the storage batteries 81 included in the power storage devices 8 are of the same type and have the same storage capacity. The storage capacity is the maximum amount of electric power that can be stored. The storage batteries 81 included in the power storage devices 8 may be different types of storage batteries and may have different storage capacities. The storage battery 81 includes, for example, a plurality of battery cells.

The BMU 82 is a device that manages the storage battery 81. The BMU 82 has a function of measuring a battery voltage Vbat of the storage battery 81, and a function of calculating a state of charge (SOC) by measuring the current value of the charging and discharging current of the storage battery 81. The BMU 82 may further have a function of measuring cell voltages of the battery cells constituting the storage battery 81. The BMU 82 transmits the battery information of the storage battery 81 to the power management device 10. The battery information includes, for example, the measured value of the battery voltage Vbat, the current value of the charging and discharging current, the temperature of the storage battery 81, the storage capacity of the battery 81, and the SOC. The BMU 82 periodically transmits the battery information to the power management device 10.

The bidirectional DC/DC converter 83 is connected to the internal DC bus B2, and is a device capable of bidirectionally converting between the internal bus voltage Vbus2 and the battery voltage Vbat. The bidirectional DC/DC converter 83 is provided between the storage battery 81 and the internal DC bus B2. The battery voltage Vbat is the voltage of the storage battery 81. As the bidirectional DC/DC converter 83, a known bidirectional DC/DC converter can be used. The bidirectional DC/DC converter 83 operates with, for example, a DC voltage internally generated based on the internal bus voltage Vbus2.

The bidirectional DC/DC converter 83 is controlled by the power management device 10. Specifically, when the bidirectional DC/DC converter 83 receives a charge command from the power management device 10, the bidirectional DC/DC converter 83 converts the internal bus voltage Vbus2 into the battery voltage Vbat and causes a charging current to flow from the internal DC bus B2 to the storage battery 81. Thus, the storage battery 81 is charged. When the bidirectional DC/DC converter 83 receives a discharge command from the power management device 10, the bidirectional DC/DC converter 83 converts the battery voltage Vbat into the internal bus voltage Vbus2 and causes a discharging current to flow from the storage battery 81 to the internal DC bus B2. Thus, the storage battery 81 is discharged. The bidirectional DC/DC converter 83 may charge or discharge the storage battery 81 in a constant-current manner or in a constant-voltage manner.

When the bidirectional DC/DC converter 83 receives a stop command from the power management device 10, the bidirectional DC/DC converter 83 stops the operation and shifts to a sleep state in which the electric power consumption is reduced. When the bidirectional DC/DC converter 83 receives the charge command or the discharge command in the sleep state, the bidirectional DC/DC converter 83 exits from the sleep state and executes the charge process or the discharge process. The bidirectional DC/DC converter 83 has a current limiting function of limiting each current value of the charging current supplied to the storage battery 81 and the discharging current discharged from the storage battery 81 to a maximum current value or less. The bidirectional DC/DC converter 83 receives a setting command for the maximum current value from the power management device 10, the bidirectional DC/DC converter 83 sets the maximum current values of the charging current and discharging current to the maximum current value specified by the setting command.

When the bidirectional DC/DC converter 83 receives a setting command for a target value of the internal bus voltage Vbus2 from the power management device 10, the bidirectional DC/DC converter 83 sets the target value of the internal bus voltage Vbus2 to the target value specified by the setting command. The target value is a voltage value for making the voltage value of the internal bus voltage Vbus2 constant. The bidirectional DC/DC converter 83 has a function of maintaining the voltage value of the internal bus voltage Vbus2 at the target value even when the power Wc is changed.

The bidirectional DC/DC converter 83 has a power measurement function of measuring the power Wc. The bidirectional DC/DC converter 83 periodically measures the power Wc, for example. The bidirectional DC/DC converter 83 transmits the measured value of the power We to the power management device 10.

The bidirectional DC/DC converter 9 is provided between the external DC bus B1 and the internal DC bus B2, and is a device capable of bidirectionally converting between the external bus voltage Vbus1 and the internal bus voltage Vbus2. As the bidirectional DC/DC converter 9, a known bidirectional DC/DC converter can be used. The bidirectional DC/DC converter 9 operates with, for example, a DC voltage internally generated based on the internal bus voltage Vbus2.

The bidirectional DC/DC converter 9 is controlled by the power management device 10. When the bidirectional DC/DC converter 9 receives a setting command for a target value of the external bus voltage Vbus1 from the power management device 10, the bidirectional DC/DC converter 9 sets the target value of the external bus voltage Vbus1 to the target value specified by the setting command. The target value is a voltage value for making the voltage value of the external bus voltage Vbus1 constant.

When the bidirectional DC/DC converter 9 receives a stop command from the power management device 10, the bidirectional DC/DC converter 9 stops the operation and shifts to a sleep state in which the electric power consumption is reduced. When the bidirectional DC/DC converter 9 receives the setting command for the target value of the external bus voltage Vbus1 in the sleep state, the bidirectional DC/DC converter 9 exits from the sleep state and executes the power transmission/reception process.

The power management device 10 is a device (controller) that manages the entire power feeding system 2A. The power management device 10 is also referred to as an energy management system (EMS). The power management device 10 is connected to the power supply device 5, the auxiliary power supply device 6, the converters 7, the power storage devices 8, and the bidirectional DC/DC converter 9 via a communication line so as to be able to communicate with each other. The communication line may be configured to be wired or wireless. The power management device 10 is connected to the upper power management device 3 via the communication network NW so as to be able to communicate with each other. The power management device 10 may perform communication conforming to standards such as RS-232C, RS-485, Controller Area Network (CAN), Ethernet (registered trademark), and Wi-Fi (registered trademark).

The power management device 10 transmits a start command and a stop command to each of the power conditioner 52, the AC/DC converter 62, the converters 7, the bidirectional DC/DC converters 83, and the bidirectional DC/DC converter 9. For example, the power management device 10 causes the converter 7 to supply the load voltage VL by transmitting the start command to the converter 7. The power management device 10 causes the converter 7 to stop supplying the load voltage VL by transmitting the stop command to the converter 7. The same applies to the other converters.

The power management device 10 performs a charge and discharge process of charging and discharging the storage battery 81 by controlling the bidirectional DC/DC converter 83. The power management device 10 performs the charge and discharge process depending on the difference power. When the sum of the supply power is larger than the sum of the load power WL (when the difference power is larger than 0), the power management device 10 transmits the charge command to the bidirectional DC/DC converter 83 and causes the storage battery 81 to store surplus electric power that is the difference power. In each storage battery 81, for example, electric power obtained by equally dividing the surplus electric power by the number of storage batteries 81 is stored. When the sum of the supply power is smaller than the sum of the load power WL (when the difference power is smaller than 0), the power management device 10 transmits the discharge command to the bidirectional DC/DC converter 83 and causes the storage battery 81 to discharge the deficient electric power. For example, electric power obtained by equally dividing the deficient electric power by the number of storage batteries 81 is discharged from each storage battery 81.

The power management device 10 switches an operation mode of the power feeding system 2A by controlling the bidirectional DC/DC converter 9. Details will be described later.

Figure 3:
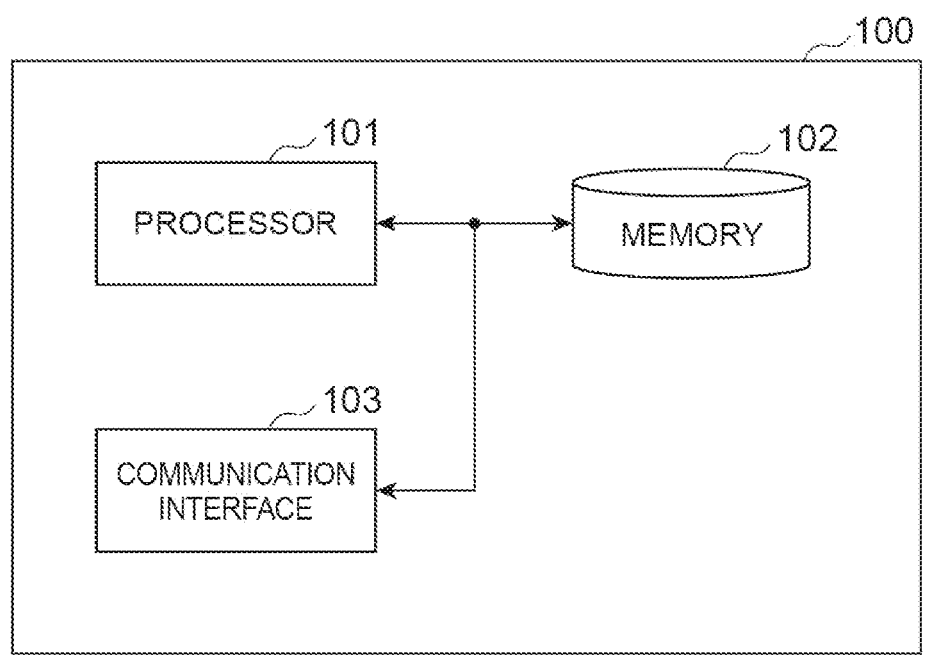
FIG. 3 is a hardware configuration diagram of the power management device shown in FIG. 2.

Next, the hardware configuration of the computer 100 constituting the power management device 10 will be described with reference to FIG. 3. FIG. 3 is a hardware configuration diagram of a computer constituting the power management device shown in FIG. 2.

The power management device 10 may be constituted by a single computer 100. The power management device 10 may be constituted by a plurality of computers 100 as in cloud computing. As shown in FIG. 3, the computer 100 physically includes hardware such as a processor 101, a memory 102, and a communication interface 103.

An example of the processor 101 is a central processing unit (CPU). The memory 102 may include a main storage device and an auxiliary storage device. The main storage device is constituted by a random access memory (RAM), a read only memory (ROM), and the like. Examples of the auxiliary storage device include a semiconductor memory and a hard disk device. The communication interface 103 is a device that transmits/receives data to/from other devices. The communication interface 103 includes, for example, a communication module, a network interface card (NIC), or a wireless communication module conforming to a communication standard such as RS-232C, RS-485, or CAN.

Figure 4:
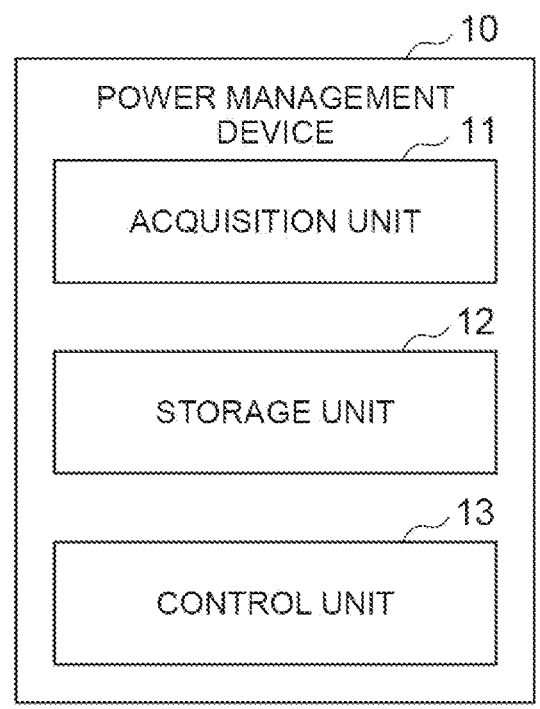
FIG. 4 is a functional block diagram of the power management device shown in FIG. 2.

By the processor 101 reading a power management program PR (see FIG. 9) stored in the memory 102 to execute the program, each hardware operates under the control of the processor 101 to read and write data from/to the memory 102. Thus, each functional unit of the power management device 10 shown in FIG. 4 is implemented. The power management device 10 of the power feeding system 2B and the upper power management device 3 have a hardware configuration similar to that of the power management device 10 of the power feeding system 2A.

Next, the functional configuration of the power management device 10 will be described with reference to FIGS. 4 and 5. FIG. 4 is a functional block diagram of the power management device shown in FIG. 2. FIG. 5 is a diagram showing an example of a plurality of combinations of a power reception target value and a power transmission target value. Here, the functional configuration of the power management device 10 of the power feeding system 2A will be described, but the power management device 10 of the power feeding system 2B has a functional configuration similar to that of the power management device 10 of the power feeding system 2A. As shown in FIG. 4, the power management device 10 functionally includes an acquisition unit 11, a storage unit 12, and a control unit 13.

The acquisition unit 11 is a functional unit that acquires the amount of electric power stored in the power feeding system 2A. The term "the amount of electric power stored in the power feeding system" may be referred to as "the amount of stored electric power of the power feeding system". The acquisition unit 11 receives the battery information from each BMU 82, and calculates the SOC of the entire power feeding system 2A based on the SOC and the storage capacity included in the battery information. For example, the acquisition unit 11 calculates the amount of electric power stored in each storage battery 81 from the SOC and the storage capacity of each storage battery 81, and calculates the SOC of the entire power feeding system 2A by dividing the total amount of electric power stored in all storage batteries 81 by the sum of the storage capacities of all storage batteries 81. Then, the acquisition unit 11 acquires the SOC of the entire power feeding system 2A as the amount of electric power stored in the power feeding system 2A. The acquisition unit 11 may acquire the minimum amount of stored electric power (SOC) among the amounts of stored electric power of all the storage batteries 81 as the amount of electric power stored in the power feeding system 2A.

The storage unit 12 is a functional unit that stores a plurality of power reception target values and a plurality of power transmission target values. Each power reception target value is a target value of the external bus voltage Vbus1 in the bidirectional DC/DC converter 9 of the power feeding system 2A when electric power is transmitted from the power feeding system 2B to the power feeding system 2A. In other words, each power reception target value is a target value of the external bus voltage Vbus1 in the bidirectional DC/DC converter 9 that receives electric power. The plurality of power reception target values are set so as to minimize power transmission loss at different transmission power values. Here, the power transmission loss is a loss of electric power occurring in power transmission and reception between the power feeding system 2A and the power feeding system 2B. The power transmission loss includes, for example, a loss caused by wiring resistance between the power feeding system 2A and the power feeding system 2B, and an internal loss in the bidirectional DC/DC converter 9.

Each power transmission target value is a target value of the external bus voltage Vbus1 in the bidirectional DC/DC converter 9 of the power feeding system 2A when electric power is transmitted from the power feeding system 2A to the power feeding system 2B. In other words, each power transmission target value is a target value of the external bus voltage Vbus1 in the bidirectional DC/DC converter 9 that transmits electric power. The plurality of power transmission target values are set so as to minimize power transmission loss at different transmission power values. It should be noted that the power transmission loss at the transmission power value can vary depending on the combination of the power transmission target value and the power reception target value. As described later, the combination of the power transmission target value and the power reception target value at which the power transmission loss at each transmission power value is minimized is measured in advance. The power reception target value at which the power transmission loss is minimized at the transmission power value means a power reception target value included in the combination at which the power transmission loss at the transmission power value is minimized, and the power transmission target value at which the power transmission loss is minimized at the transmission power value means a power transmission target value included in the combination at which the power transmission loss at the transmission power value is minimized.

As shown in FIG. 5, in the present embodiment, the storage unit 12 stores a plurality of combinations of a power reception target value and a power transmission target value at which power transmission loss is minimized at different transmission power values. That is, if the transmission power value when electric power is transmitted from the power feeding system 2A to the power feeding system 2B is equal to the transmission power value when electric power is transmitted from the power feeding system 2B to the power feeding system 2A, the same combination is used. The storage unit 12 stores a plurality of combinations in a table format, for example. The storage unit 12 of the power feeding system 2A and the storage unit 12 of the power feeding system 2B have the same table.

The combinations of the power reception target value and the power transmission target value are set for several transmission power values between the maximum power Wmax and 0W. The maximum power Wmax is a maximum value of electric power that can be output by the bidirectional DC/DC converter 9. For example, when the maximum power Wmax is 2500 W, the above-mentioned combinations may be set every 100 W such as 2500 W, 2400 W, 2300 W, etc. The power transmission target value corresponding to the maximum power Wmax is, for example, DC 380 V, and the power reception target value is, for example, DC 340 V.

Each combination is measured to be set in advance. For example, a plurality of combinations of a power reception target value and a power transmission target value are prepared, and the combination at which the power transmission loss is minimized at each transmission power value is selected as the combination at the transmission power value.

The control unit 13 is a functional unit that switches the operation mode of the power feeding system 2A by controlling the bidirectional DC/DC converter 9. The operation mode of the power feeding system 2A includes a power reception mode, a power transmission mode, and a normal mode. The power reception mode is a mode in which the power feeding system 2A receives DC electric power from another power feeding system (in the present embodiment, the power feeding system 2B). The power transmission mode is a mode in which the power feeding system 2A supplies DC electric power to another power feeding system (in the present embodiment, the power feeding system 2B). The normal mode is a mode in which the power feeding system 2A does not transmit or receive electric power to or from another power feeding system (the power feeding system 2B in the present embodiment). The control unit 13 controls the bidirectional DC/DC converter 9 using a storage threshold value Bth1 (first storage threshold value), a storage threshold value Bth2 (second storage threshold value), a storage threshold value Bth3 (first stop threshold value), a storage threshold value Bth4 (second stop threshold value), a storage threshold value Bth5, and a storage threshold value Bth6.

The storage threshold value Bth1 is a threshold value for determining that the amount of electric power stored in the power feeding system 2A is insufficient and that electric power needs to be received from another power feeding system (the power feeding system 2B in the present embodiment). The storage threshold value Bth1 is represented by, for example, SOC. The storage threshold value Bth1 is set to, for example, 20%. The storage threshold value Bth2 is a threshold value for determining that the amount of electric power stored in the power feeding system 2A is excessive and that electric power can be transmitted to another power feeding system (the power feeding system 2B in the present embodiment). The storage threshold value Bth2 is larger than the storage threshold value Bth1. The storage threshold value Bth2 is represented by, for example, SOC. The storage threshold value Bth2 is set to, for example, 70%.

The storage threshold value Bth3 is a threshold value for determining that the amount of electric power stored in the power feeding system 2A has been sufficient. The storage threshold value Bth3 is larger than the storage threshold value Bth1 and smaller than the storage threshold value Bth2. The storage threshold value Bth3 is represented by, for example, SOC. The storage threshold value Bth3 is set to 50%, for example. The storage threshold value Bth4 is a threshold value for determining that the amount of electric power stored in the power feeding system 2A decreases and no more electric power can be transmitted to another power feeding system (in the present embodiment, the power feeding system 2B). The storage threshold value Bth4 is larger than the storage threshold value Bth1 and smaller than the storage threshold value Bth2. The storage threshold value Bth4 may be the same value as or the different value from the storage threshold value Bth3. The storage threshold value Bth4 is represented by, for example, SOC. The storage threshold value Bth4 is set to 50%, for example.

The storage threshold value Bth5 is a threshold value for determining that the amount of electric power stored in the power feeding system 2A is not sufficient but has been stored to a certain degree. The storage threshold value Bth5 is larger than the storage threshold value Bth1 and smaller than the storage threshold value Bth3. The storage threshold value Bth5 is represented by, for example, SOC. The storage threshold value Bth5 is set to, for example, 35%. The storage threshold value Bth6 is a threshold value for determining that electric power can be transmitted to another power feeding system (the power feeding system 2B in the present embodiment) but has decreased to a certain degree. The storage threshold value Bth6 is larger than the storage threshold value Bth4 and smaller than the storage threshold value Bth2. The storage threshold value Bth6 is represented by, for example, SOC. The storage threshold value Bth6 is set to 60%, for example.

The control unit 13 transmits and receives a power transmission request and a change request to and from the upper power management device 3. The power transmission request is a request for receiving electric power from another power feeding system. The change request is a request for changing the transmission power value.

Figure 6:
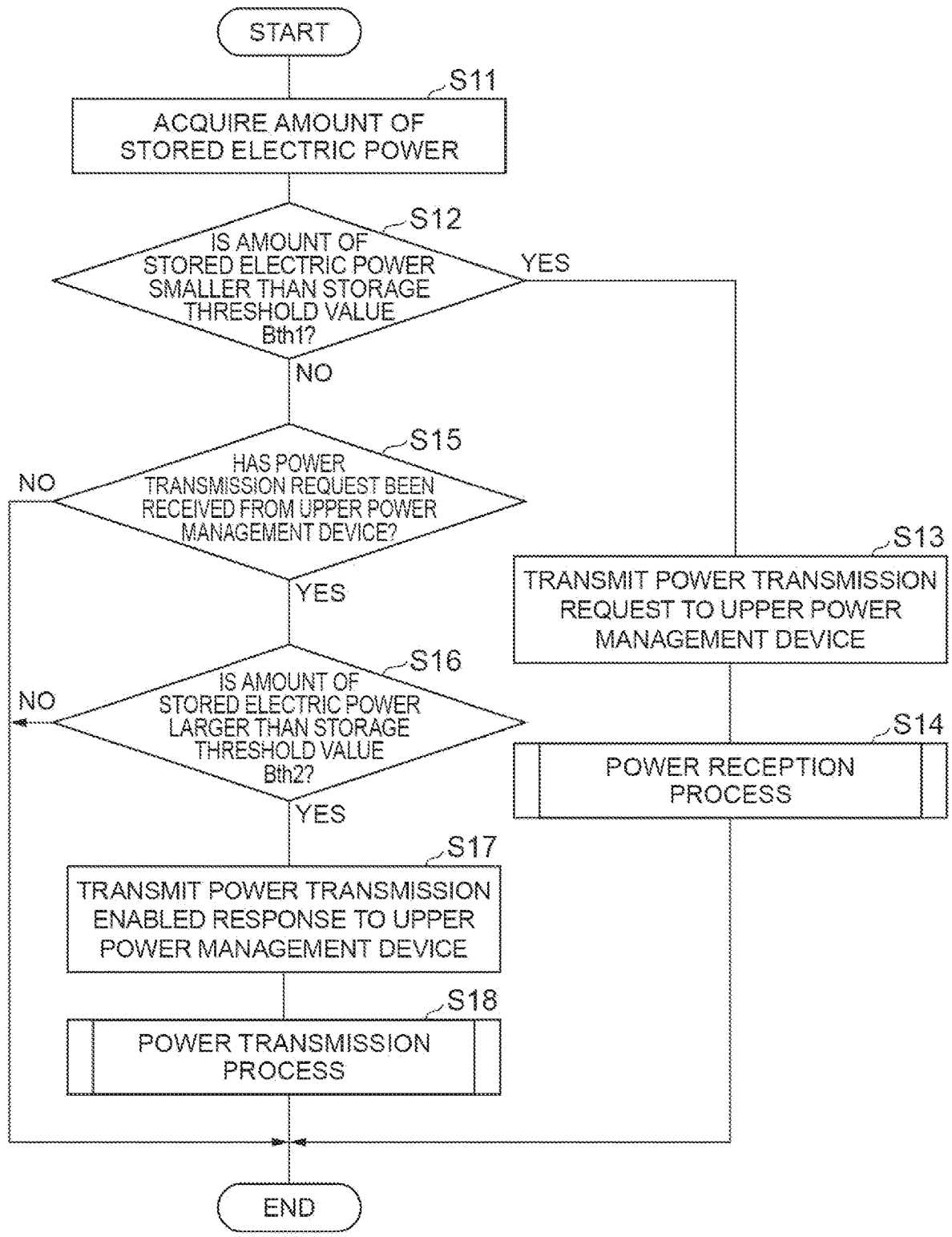
FIG. 6 is a flowchart showing a series of processes of a power management method performed by the power management device shown in FIG. 2.
Figure 7:
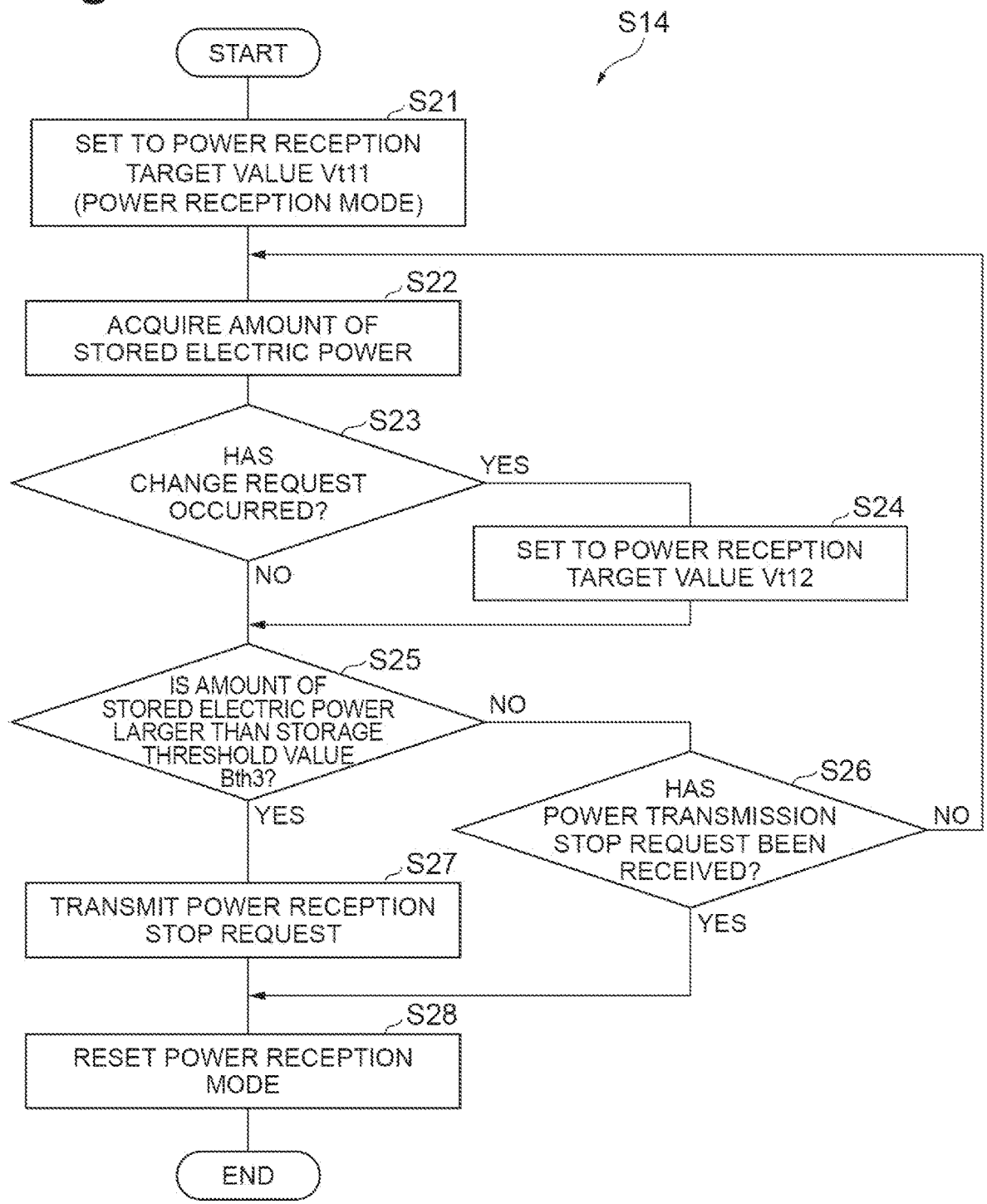
FIG. 7 is a flowchart showing the power reception process shown in FIG. 6 in detail.
Figure 8:
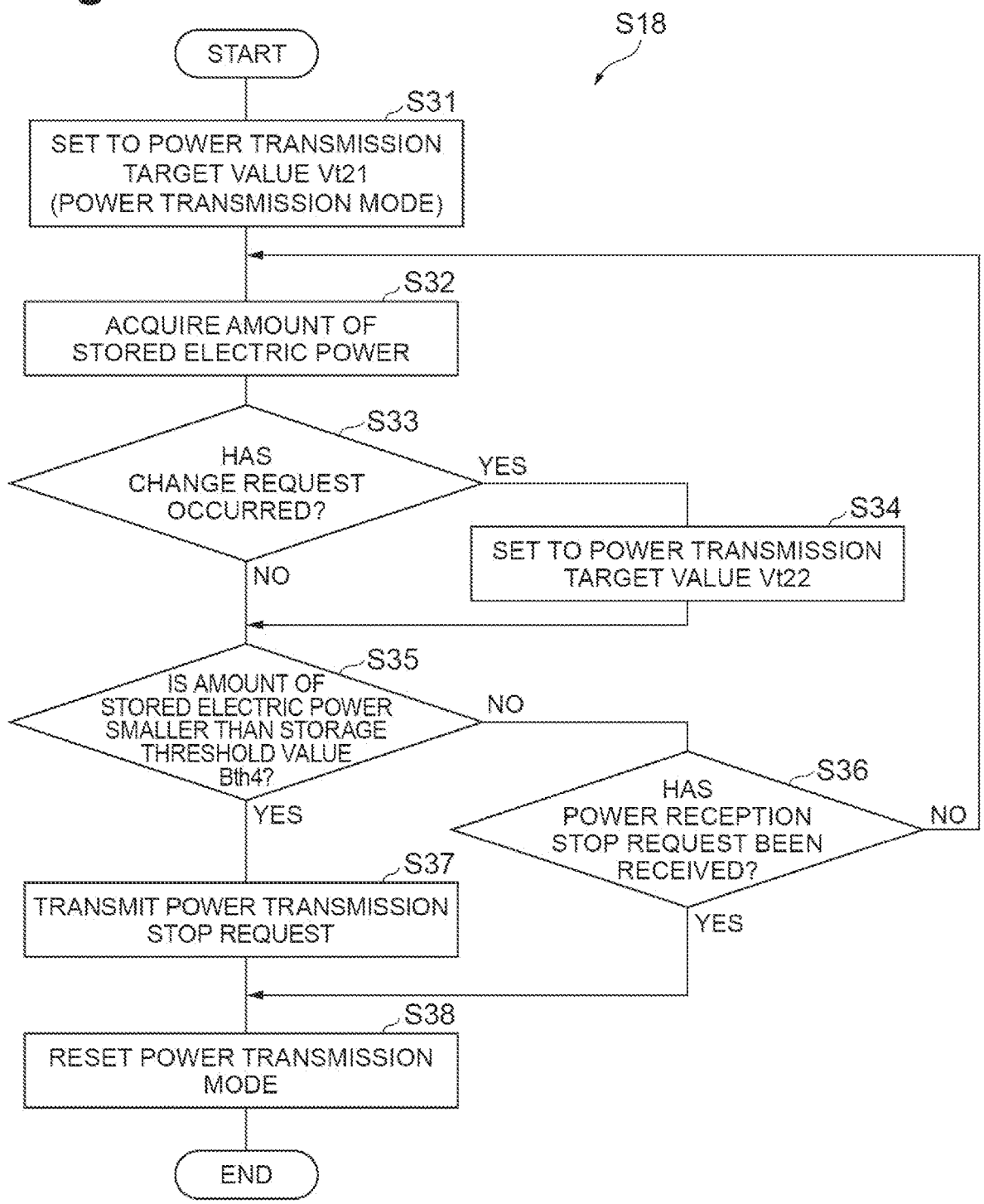
FIG. 8 is a flowchart showing the power transmission process shown in FIG. 6 in detail.

Next, a series of processes of a power management method performed by the power management device 10 will be described with reference to FIGS. 6 to 8. FIG. 6 is a flowchart showing a series of processes of a power management method performed by the power management device shown in FIG. 2. FIG. 7 is a flowchart showing the power reception process shown in FIG. 6 in detail. FIG. 8 is a flowchart showing the power transmission process shown in FIG. 6 in detail. The series of processes shown in FIG. 6 is started after a certain period of time has elapsed since the power management device 10 is turned on, and is repeatedly performed while the power management device 10 is operating.

First, the acquisition unit 11 acquires the amount of electric power stored in the power feeding system 2A (step S11). In step S11, the acquisition unit 11 receives the battery information from each BMU 82, for example, and calculates the SOC of the entire power feeding system 2A based on the SOC and the storage capacity included in the battery information. Then, the acquisition unit 11 acquires the SOC of the entire power feeding system 2A as the amount of electric power stored in the power feeding system 2A. The acquisition unit 11 may acquire, as the amount of electric power stored in the power feeding system 2A, the minimum amount of stored electric power among the amounts of stored electric power of all the batteries 81. Then, the acquisition unit 11 outputs the amount of electric power stored in the power feeding system 2A to the control unit 13.

Subsequently, when the control unit 13 receives the amount of electric power stored in the power feeding system 2A from the acquisition unit 11, the control unit 13 determines whether or not the amount of electric power stored in the power feeding system 2A is smaller than the storage threshold value Bth1 by comparing the amount of electric power stored in the power feeding system 2A with the storage threshold value Bth1 (step S12). When it is determined in step S12 that the amount of electric power stored in the power feeding system 2A is smaller than the storage threshold value Bth1 (less than the storage threshold value Bth1) (step S12; YES), the amount of electric power stored in the power feeding system 2A is insufficient and electric power needs to be received from the power feeding system 2B. Therefore, the control unit 13 transmits a power transmission request (first power transmission request) to the upper power management device 3 (step S13), and then performs a power reception process (step S14). In the present embodiment, the power feeding system responding to the power transmission request is arranged to start power transmission at the maximum power Wmax. The control unit 13 may transmit the transmission power value to the upper power management device 3 together with the power transmission request.

In the power reception process in step S14, as shown in FIG. 7, first, the control unit 13 selects a power reception target value Vt11 (first power reception target value) corresponding to the maximum power Wmax from among the plurality of power reception target values in the storage unit 12. In the example shown in FIG. 5, DC 340 V is selected as the power reception target value Vt11. Then, the control unit 13 sets the power feeding system 2A to the power reception mode by setting the target value of the external bus voltage Vbus1 in the bidirectional DC/DC converter 9 to the power reception target value Vt11 (step S21).

On the other hand, when the control unit 13 of the power feeding system 2B receives the power transmission request from the power feeding system 2A via the upper power management device 3, the control unit 13 selects a power transmission target value Vt21 corresponding to the maximum power Wmax from among the plurality of power transmission target values in the storage unit 12. In the example shown in FIG. 5, DC 380 V is selected as the power transmission target value Vt21. Then, the control unit 13 of the power feeding system 2B sets the power feeding system 2B to the power transmission mode by setting the target value of the external bus voltage Vbus1 in the bidirectional DC/DC converter 9 to the power transmission target value Vt21. Accordingly, power transmission (power interchange) from the power feeding system 2B to the power feeding system 2A is started. At this time, the target value of the external bus voltage Vbus1 in the bidirectional DC/DC converter 9 of the power feeding system 2B is set to the power transmission target value Vt21, and the target value of the external bus voltage Vbus1 in the bidirectional DC/DC converter 9 of the power feeding system 2A is set to the power reception target value Vt11. Therefore, electric power is transmitted at the maximum power Wmax while minimizing power transmission loss.

Subsequently, in the same manner as in step S11, the acquisition unit 11 acquires the amount of electric power stored in the power feeding system 2A (step S22), and outputs the amount of electric power stored in the power feeding system 2A to the control unit 13. Then, the control unit 13 determines whether or not a change request has occurred (step S23). The change request includes a change request occurring in the power feeding system 2A and a change request occurring in the power feeding system 2B.

For example, the control unit 13 compares the amount of electric power stored in the power feeding system 2A with the storage threshold value Bth5, and determines that a change request has occurred in the power feeding system 2A when the amount of electric power stored in the power feeding system 2A is larger than the storage threshold value Bth5 (exceeds the storage threshold value Bth5). At this time, the control unit 13 transmits the transmission power value together with the change request to the upper power management device 3, and the upper power management device 3 transmits the change request and the transmission power value to the power feeding system 2B. In the present embodiment, the intermediate power Wmid is used as the transmission power value transmitted together with the change request. The intermediate power Wmid is smaller than the maximum power Wmax. That is, the change request is a request for changing the maximum power Wmax (first transmission power value) to the intermediate power Wmid (third transmission power value).

When the control unit 13 receives the change request from the power feeding system 2B via the upper power management device 3, the control unit 13 determines that the change request has occurred in the power feeding system 2B. More specifically, the control unit 13 of the power feeding system 2B compares, for example, the amount of electric power stored in the power feeding system 2B with the storage threshold value Bth6. When the amount of electric power stored in the power feeding system 2B is smaller than the storage threshold value Bth6 (less than the storage threshold value Bth6), the control unit 13 of the power feeding system 2B transmits the transmission power value together with the change request to the upper power management device 3. Then, the upper power management device 3 transmits the change request and the transmission power value to the power feeding system 2A. Accordingly, the control unit 13 of the power feeding system 2A receives the change request from the power feeding system 2B via the upper power management device 3.

When it is determined in step S23 that a change request has occurred (step S23; YES), the control unit 13 selects a power reception target value Vt12 (second power reception target value) corresponding to the intermediate power Wmid from among the plurality of power reception target values in the storage unit 12. In the example shown in FIG. 5, DC 290 V is selected as the power reception target value Vt12. Then, the control unit 13 sets the target value of the external bus voltage Vbus1 in the bidirectional DC/DC converter 9 to the power reception target value Vt12 (step S24).

At this time, the control unit 13 of the power feeding system 2B also determines that a change request has occurred. Therefore, the control unit 13 of the power feeding system 2B selects a power transmission target value Vt22 corresponding to the intermediate power Wmid from among the plurality of power transmission target values in the storage unit 12. In the example shown in FIG. 5, DC 330 V is selected as the power transmission target value Vt22. Then, the control unit 13 of the power feeding system 2B sets the target value of the external bus voltage Vbus1 in the bidirectional DC/DC converter 9 to the power transmission target value Vt22. Therefore, electric power is transmitted at the intermediate power Wmid while minimizing power transmission loss.

Subsequently, the control unit 13 determines whether or not the amount of electric power stored in the power feeding system 2A is larger than the storage threshold value Bth3 by comparing the amount of electric power stored in the power feeding system 2A with the storage threshold value Bth3 (step S25). When it is determined in step S23 that no change request has occurred (step S23; NO), step S25 is executed without changing the power reception target value. When it is determined in step S25 that the amount of electric power stored in the power feeding system 2A is equal to or smaller than the storage threshold value Bth3 (step S25; NO), the power reception mode is maintained because the amount of electric power stored in the power feeding system 2A is not sufficient.

Then, the control unit 13 determines whether or not a power transmission stop request has been received from the upper power management device 3 (step S26). The power transmission stop request is, for example, a signal transmitted by (the control unit 13 of) the power feeding system 2B when the power feeding system 2B set in the power transmission mode can no longer maintain power transmission. Details of the power transmission stop request will be described later. When it is determined in step S26 that the control unit 13 has not received any power transmission stop request (step S26; NO), the power reception mode is maintained and step S22 is executed again.

On the other hand, when it is determined in step S25 that the amount of electric power stored in the power feeding system 2A is larger than the storage threshold value Bth3 (exceeds the storage threshold value Bth3) (step S25; YES), the control unit 13 transmits a power reception stop request to the upper power management device 3 (step S27). Then, the control unit 13 determines that the amount of electric power stored in the power feeding system 2A is sufficient, and resets the power reception mode of the power feeding system 2A (step S28). Similarly, when it is determined in step S26 that the control unit 13 has received the power transmission stop request (step S26; YES), the control unit 13 resets the power reception mode of the power feeding system 2A (step S28). For example, the control unit 13 resets the power reception mode of the power feeding system 2A by stopping the bidirectional DC/DC converter 9, and sets the power feeding system 2A to the normal mode. At this time, the bidirectional DC/DC converter 9 stops converting the external bus voltage Vbus1 into the internal bus voltage Vbus2, and stops passing an electric current from the external DC bus B1 to the internal DC bus B2.

Thus, the power reception process in step S14 is completed, and the series of processes shown in FIG. 6 is completed.

On the other hand, when it is determined in step S12 that the amount of electric power stored in the power feeding system 2A is equal to or larger than the storage threshold value Bth1 (step S12; NO), the control unit 13 determines whether or not a power transmission request (second power transmission request) has been received from the power feeding system 2B via the upper power management device 3 (step S15). For example, when the amount of electric power stored in the power feeding system 2B is smaller than the storage threshold value Bth1 (less than the storage threshold value Bth1), the control unit 13 of the power feeding system 2B transmits a power transmission request to the upper power management device 3, and the upper power management device 3 transmits the power transmission request to the power feeding system 2A. When it is determined in step S15 that the control unit 13 has not received any power transmission request from the upper power management device 3 (step S15; NO), since it is not necessary to transmit electric power to the power feeding system 2B, the power feeding system 2A maintains the normal mode in which no electric power is transmitted to or received from the power feeding system 2B, and the series of processes shown in FIG. 6 is completed.

On the other hand, when it is determined in step S15 that the control unit 13 has received a power transmission request from the upper power management device 3 in step S15 (step S15; YES), the control unit 13 determines whether or not the amount of electric power stored in the power feeding system 2A is larger than the storage threshold value Bth2 by comparing the amount of electric power stored in the power feeding system 2A with the storage threshold value Bth2 (step S16). When it is determined in step S16 that the amount of electric power stored in the power feeding system 2A is equal to or smaller than the storage threshold value Bth2 (step S16; NO), the amount of electric power stored in the power feeding system 2A is not insufficient but is not excessive. In this case, the power feeding system 2A maintains the normal mode in which no electric power is transmitted to or received from the power feeding system 2B, and the series of processes shown in FIG. 6 is completed.

On the other hand, when it is determined in step S16 that the amount of electric power stored in the power feeding system 2A is larger than the storage threshold value Bth2 (exceeds the storage threshold value Bth2) (step S16; YES), since the amount of electric power stored in the power feeding system 2A is excessive, the power feeding system 2A is in a state capable of transmitting electric power to the power feeding system 2B. In this case, the control unit 13 transmits a power transmission enabled response to the upper power management device 3 (step S17), and performs power transmission process (step S18). As described above, in the present embodiment, the power feeding system responding to the power transmission request is arranged to start power transmission at the maximum power Wmax.

In the power transmission process in step S18, as shown in FIG. 8, first, the control unit 13 selects the power transmission target value Vt21 (first power transmission target value) corresponding to the maximum power Wmax from among the plurality of power transmission target values in the storage unit 12. Then, the control unit 13 sets the power feeding system 2A to the power transmission mode by setting the target value of the external bus voltage Vbus1 in the bidirectional DC/DC converter 9 to the power transmission target value Vt21 (step S31).

On the other hand, the control unit 13 of the power feeding system 2B selects the power reception target value Vt11 corresponding to the maximum power Wmax from among the plurality of power reception target values in the storage unit 12. Then, the control unit 13 of the power feeding system 2B sets the power feeding system 2B to the power reception mode by setting the target value of the external bus voltage Vbus1 in the bidirectional DC/DC converter 9 to the power reception target value Vt11. Accordingly, power transmission (power interchange) from the power feeding system 2A to the power feeding system 2B is started. At this time, the target value of the external bus voltage Vbus1 in the bidirectional DC/DC converter 9 of the power feeding system 2A is set to the power transmission target value Vt21, and the target value of the external bus voltage Vbus1 in the bidirectional DC/DC converter 9 of the power feeding system 2B is set to the power reception target value Vt11. Therefore, electric power is transmitted at the maximum power Wmax while minimizing power transmission loss.

Subsequently, in the same manner as in step S11, the acquisition unit 11 acquires the amount of electric power stored in the power feeding system 2A (step S32) and outputs the amount of electric power stored in the power feeding system 2A to the control unit 13. Then, the control unit 13 determines whether or not a change request has occurred (step S33). For example, the control unit 13 compares the amount of electric power stored in the power feeding system 2A with the storage threshold value Bth6, and determines that a change request has occurred in the power feeding system 2A when the amount of electric power stored in the power feeding system 2A is smaller than the storage threshold value Bth6 (less than the storage threshold value Bth6). At this time, the control unit 13 transmits the transmission power value together with the change request to the upper power management device 3, and the upper power management device 3 transmits the change request and the transmission power value to the power feeding system 2B. As in step S23, the intermediate power Wmid is used as the transmission power value transmitted together with the change request. That is, the change request is a request for changing the maximum power Wmax (second transmission power value) to the intermediate power Wmid (fourth transmission power value).

When the control unit 13 receives the change request from the power feeding system 2B via the upper power management device 3, the control unit 13 determines that the change request has occurred in the power feeding system 2B. More specifically, the control unit 13 of the power feeding system 2B compares, for example, the amount of electric power stored in the power feeding system 2B with the storage threshold value Bth5. When the amount of electric power stored in the power feeding system 2B is larger than the storage threshold value Bth5 (exceeds the storage threshold value Bth5), the control unit 13 of the power feeding system 2B transmits the transmission power value together with the change request to the upper power management device 3. Then, the upper power management device 3 transmits the change request and the transmission power value to the power feeding system 2A. Accordingly, the control unit 13 of the power feeding system 2A receives the change request from the power feeding system 2B via the upper power management device 3.

When it is determined in step S33 that a change request has occurred (step S33; YES), the control unit 13 selects the power transmission target value Vt22 (second power transmission target value) corresponding to the intermediate power Wmid from among the plurality of power transmission target values in the storage unit 12. Then, the control unit 13 sets the target value of the external bus voltage Vbus1 in the bidirectional DC/DC converter 9 to the power transmission target value Vt22 (step S34).

At this time, the control unit 13 of the power feeding system 2B also determines that a change request has occurred. Therefore, the control unit 13 of the power feeding system 2B selects the power reception target value Vt12 corresponding to the intermediate power Wmid from among the plurality of power reception target values in the storage unit 12. Then, the control unit 13 of the power feeding system 2B sets the target value of the external bus voltage Vbus1 in the bidirectional DC/DC converter 9 to the power reception target value Vt12. Accordingly, electric power is transmitted at the intermediate power Wmid while minimizing power transmission loss.

Subsequently, the control unit 13 determines whether or not the amount of electric power stored in the power feeding system 2A is smaller than the storage threshold value Bth4 by comparing the amount of electric power stored in the power feeding system 2A with the storage threshold value Bth4 (step S35). When it is determined in step S33 that no change request has occurred (step S33; NO), step S35 is executed without changing the power transmission target value. When it is determined in step S35 that the amount of electric power stored in the power feeding system 2A is equal to or larger than the storage threshold value Bth4 (step S35; NO), the power feeding system 2A has a sufficient amount of stored electric power for transmission to the power feeding system 2B, so that the power transmission mode is maintained.

Then, the control unit 13 determines whether or not a power reception stop request has been received from the upper power management device 3 (step S36). As described above, the power reception stop request is, for example, a signal transmitted by (the control unit 13 of) the power feeding system 2B when the amount of electric power stored in the power feeding system 2B set to the power reception mode is sufficient. When it is determined in step S36 that the control unit 13 has not received any power reception stop request (step S36; NO), the power transmission mode is maintained and step S32 is executed again.

On the other hand, when it is determined in step S35 that the amount of electric power stored in the power feeding system 2A is smaller than the storage threshold value Bth4 (less than the storage threshold value Bth4) (step S35; YES), the control unit 13 transmits a power transmission stop request to the upper power management device 3 (step S37). Then, the control unit 13 determines that the amount of electric power stored in the power feeding system 2A is not sufficient and no more electric power can be transmitted, and resets the power transmission mode of the power feeding system 2A (step S38). Similarly, when it is determined in step S36 that the control unit 13 has received the power reception stop request (step S36; YES), the control unit 13 resets the power transmission mode of the power feeding system 2A (step S38). For example, the control unit 13 resets the power transmission mode of the power feeding system 2A by stopping the bidirectional DC/DC converter 9, and sets the power feeding system 2A to the normal mode. At this time, the bidirectional DC/DC converter 9 stops converting the internal bus voltage Vbus2 into the external bus voltage Vbus1, and stops passing an electric current from the internal DC bus B2 to the external DC bus B1.

Thus, the power transmission process in step S18 is completed, and the series of process shown in FIG. 6 is completed.

Note that step S15 may be performed prior to step S16 or in parallel with step S16. Step S25 may be performed prior to step S26 or may be performed in parallel with step S26. Step S35 may be performed prior to step S36 or may be performed in parallel with step S36.

When a certain value is compared with a threshold value in each determination, if the value is equal to the threshold value, any determination result may be applied. For example, in step S12, the control unit 13 determines whether or not the amount of stored electric power is smaller than the storage threshold value Bth1, but may determine whether or not the amount of stored electric power is equal to or smaller than the storage threshold value Bth1. The same applies to other determinations.

Figure 9:
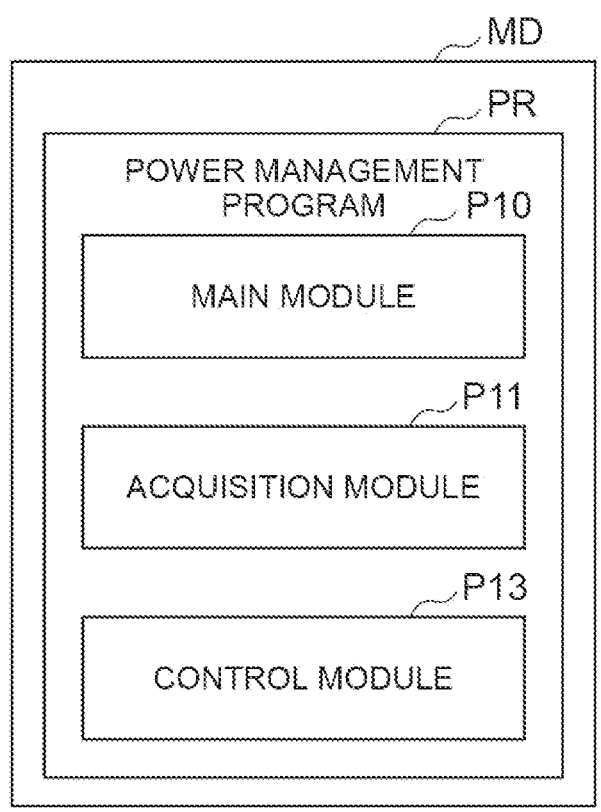
FIG. 9 is a diagram showing a configuration of a power management program recorded in a recording medium.

Next, a power management program PR for causing the computer 100 to function as the power management device 10 and a recording medium MD in which the power management program PR is recorded will be described with reference to FIG. 9. FIG. 9 is a diagram showing a configuration of a power management program recorded in a recording medium.

As shown in FIG. 9, the power management program PR includes a main module P10, an acquisition module P11, and a control module P13. The main module P10 is a section that integrally controls processes relating to the power management device 10. The functions realized by executing the acquisition module P11 and the control module P13 are the same as the functions of the acquisition unit 11 and the control unit 13 in the above-described embodiment, respectively.

The power management program PR is recorded in the recording medium MD. The recording medium MD is a non-transitory computer-readable recording medium. Examples of the recording medium MD include a compact disc read only memory (CD-ROM), a digital versatile disc read only memory (DVD-ROM), and a semiconductor memory. The power management program PR may be provided as data signals via the communication network NW.

In the power management device 10, the power management method, and the power management program PR described above, the operation mode of the power feeding system 2A is switched based on the amount of electric power stored in the power feeding system 2A. When the amount of electric power stored in the power feeding system 2A is less than the storage threshold value Bth1, the power reception target value Vt11 corresponding to the maximum power Wmax in the power transmission request is selected from among the plurality of power reception target values, the target value of the external bus voltage Vbus1 in the bidirectional DC/DC converter 9 of the power feeding system 2A is set to the power reception target value Vt11, and the power feeding system 2A is set to the power reception mode. At this time, in the power feeding system 2B, the power transmission target value Vt21 corresponding to the maximum power Wmax in the power transmission request is selected from among the plurality of power transmission target values, and the target value of the external bus voltage Vbus1 in the bidirectional DC/DC converter 9 of the power feeding system 2B is set to the power transmission target value Vt21. Accordingly, the power transmission target value V21 at which the power transmission loss at the maximum power Wmax is minimized is set in the bidirectional DC/DC converter 9 of the power feeding system 2B, and the power reception target value Vt11 at which the power transmission loss at the maximum power Wmax is minimized is set in the bidirectional DC/DC converter 9 of the power feeding system 2A. Therefore, power transmission loss in power transmission from the power feeding system 2B to the power feeding system 2A can be suppressed. By the similar control, when the power feeding system 2A is set to the power transmission mode, the power transmission target value Vt21 at which the power transmission loss at the maximum power Wmax is minimized is set in the bidirectional DC/DC converter 9 of the power feeding system 2A, and the power reception target value Vt11 at which the power transmission loss at the maximum power Wmax is minimized is set in the bidirectional DC/DC converter 9 of the power feeding system 2B. Therefore, power transmission loss in power transmission from the power feeding system 2A to the power feeding system 2B can be suppressed. As described above, the power transmission efficiency between the power feeding system 2A and the power feeding system 2B can be improved.

The control unit 13 selects the power reception target value Vt12 corresponding to the intermediate power Wmid from among the plurality of power reception target values in response to a change request for changing the transmission power value from the maximum power Wmax to the intermediate power Wmid occurring in a state in which the power feeding system 2A is set to the power reception mode, and sets the target value of the external bus voltage Vbus1 to the power reception target value Vt12. At this time, in the power feeding system 2B, the control unit 13 selects the power transmission target value Vt22 corresponding to the intermediate power Wmid from among the plurality of power transmission target values, and sets the target value of the external bus voltage Vbus1 to the power transmission target value Vt22. According to this configuration, even if the transmission power value is changed, the power reception target value Vt12 for minimizing the power transmission loss at the changed transmission power value (intermediate power Wmid) is set in the bidirectional DC/DC converter 9 of the power feeding system 2A, and the power transmission target value Vt22 for minimizing the power transmission loss at the changed transmission power value (intermediate power Wmid) is set in the bidirectional DC/DC converter 9 of the power feeding system 2B. Therefore, even if the transmission power value is changed, the power transmission loss in the power transmission from the power feeding system 2B to the power feeding system 2A can be suppressed, so that the power transmission efficiency can be improved.

The control unit 13 selects the power transmission target value Vt22 corresponding to the intermediate power Wmid from among the plurality of power transmission target values in response to a change request for changing the transmission power value from the maximum power Wmax to the intermediate power Wmid occurring in a state in which the power feeding system 2A is set to the power transmission mode, and sets the target value of the external bus voltage Vbus1 to the power transmission target value Vt22. At this time, in the power feeding system 2B, the control unit 13 selects the power reception target value Vt12 corresponding to the intermediate power Wmid from among the plurality of power reception target values, and sets the target value of the external bus voltage Vbus1 to the power reception target value Vt12. According to this configuration, even if the transmission power value is changed, the power transmission target value Vt22 for minimizing the power transmission loss at the changed transmission power value (intermediate power Wmid) is set in the bidirectional DC/DC converter 9 of the power feeding system 2A, and the power reception target value Vt12 for minimizing the power transmission loss at the changed transmission power value (intermediate power Wmid) is set in the bidirectional DC/DC converter 9 of the power feeding system 2B. Therefore, even if the transmission power value is changed, the power transmission loss in the power transmission from the power feeding system 2A to the power feeding system 2B can be suppressed, so that the power transmission efficiency can be improved.

The control unit 13 resets the power reception mode of the power feeding system 2A in response to the amount of electric power stored in the power feeding system 2A exceeding the storage threshold value Bth3 in a state in which the power feeding system 2A is set to the power reception mode. According to this configuration, the power reception mode can be reset before the power feeding system 2A receives excessive electric power. This makes it possible to receive electric power from the power feeding system 2B to the extent that the power feeding system 2A does not receive electric power more than necessary.

The control unit 13 resets the power transmission mode of the power feeding system 2A in response to the amount of electric power stored in the power feeding system 2A being less than the storage threshold value Bth4 in a state in which the power feeding system 2A is set to the power transmission mode. According to this configuration, the power transmission mode can be reset before the amount of electric power stored in the power feeding system 2A becomes insufficient. This makes it possible to transmit electric power to the power feeding system 2B to the extent that the amount of electric power stored in the power feeding system 2A is not insufficient.

Figure 10:
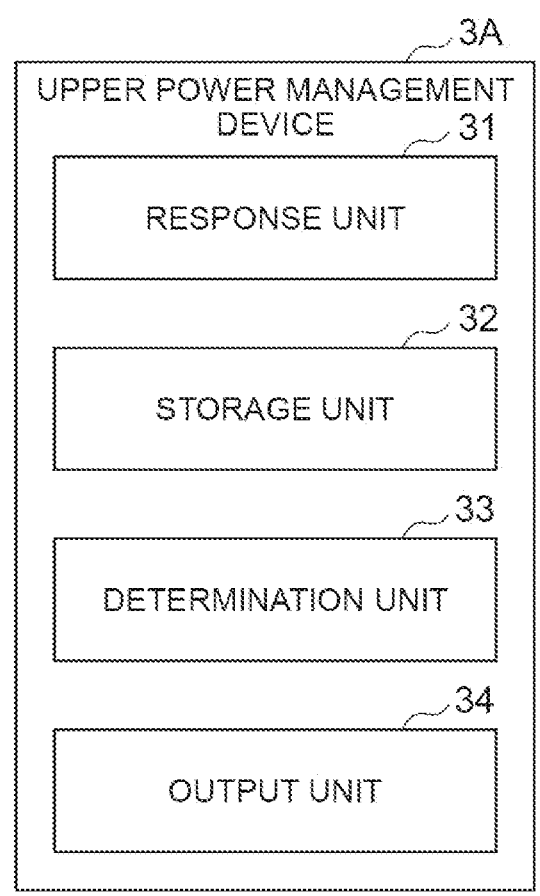
FIG. 10 is a functional block diagram of an upper power management device according to another embodiment.

Next, a power interchange system including an upper power management device according to another embodiment will be described with reference to FIG. 10. FIG. 10 is a functional block diagram of an upper power management device according to another embodiment. The power interchange system according to another embodiment is mainly different from the power interchange system 1 in that the power interchange system includes an upper power management device 3A in place of the upper power management device 3, and the upper power management device 3A determines each target value in place of the power management devices 10 of the power feeding systems 2A and 2B. Since the other points are the same as those of the power interchange system 1, detailed description thereof will be omitted.

The upper power management device 3A shown in FIG. 10 controls power transmission and reception (power interchange) between the power feeding system 2A (first power feeding system) and the power feeding system 2B (second power feeding system). The upper power management device 3A functionally includes a response unit 31, a storage unit 32, a determination unit 33, and an output unit 34.

The response unit 31 is a functional unit that responds to a power transmission request. When the response unit 31 receives a power transmission request from one power feeding system of the power feeding systems 2A and 2B, the response unit 31 transmits the power transmission request to the other power feeding system. When the response unit 31 receives a power transmission enabled response as a response to the power transmission request from the other power feeding system, the response unit 31 transmits the power transmission enabled response to the power feeding system that is making the power transmission request. When the response unit 31 receives a power transmission disabled response as a response to the power transmission request from the other power feeding system, the response unit 31 transmits the power transmission disabled response to the power feeding system that is making the power transmission request.

The storage unit 32 is a functional unit that stores a combination group (first combination group). The combination group includes a plurality of combinations of a power transmission target value and a power reception target value at which power transmission loss is minimized at different transmission power values. In the present embodiment, the same combination group is used for the case where electric power is transmitted from the power feeding system 2A to the power feeding system 2B and the case where electric power is transmitted from the power feeding system 2B to the power feeding system 2A. Therefore, the storage unit 32 is substantially the same as the storage unit 12.

The determination unit 33 is a functional unit that determines a target value (hereinafter referred to as "first target value") of the external bus voltage Vbus1 in the bidirectional DC/DC converter 9 (first converter) of the power feeding system 2A and a target value (hereinafter referred to as "second target value") of the external bus voltage Vbus1 in the bidirectional DC/DC converter 9 (second converter) of the power feeding system 2B. Specifically, when the determination unit 33 receives a power transmission request from the power feeding system 2A, the determination unit 33 selects a combination corresponding to the transmission power value (for example, maximum power Wmax) in the power transmission request from the combination group, determines the power reception target value included in the selected combination as the first target value, and determines the power transmission target value included in the selected combination as the second target value.

The output unit 34 is a functional unit that outputs a setting command (first setting command) for setting the first target value in the bidirectional DC/DC converter 9 of the power feeding system 2A and a setting command (second setting command) for setting the second target value in the bidirectional DC/DC converter 9 of the power feeding system 2B. The output unit 34 outputs (transmits) the setting command to the power management device 10 of each power feeding system.

Figure 11:
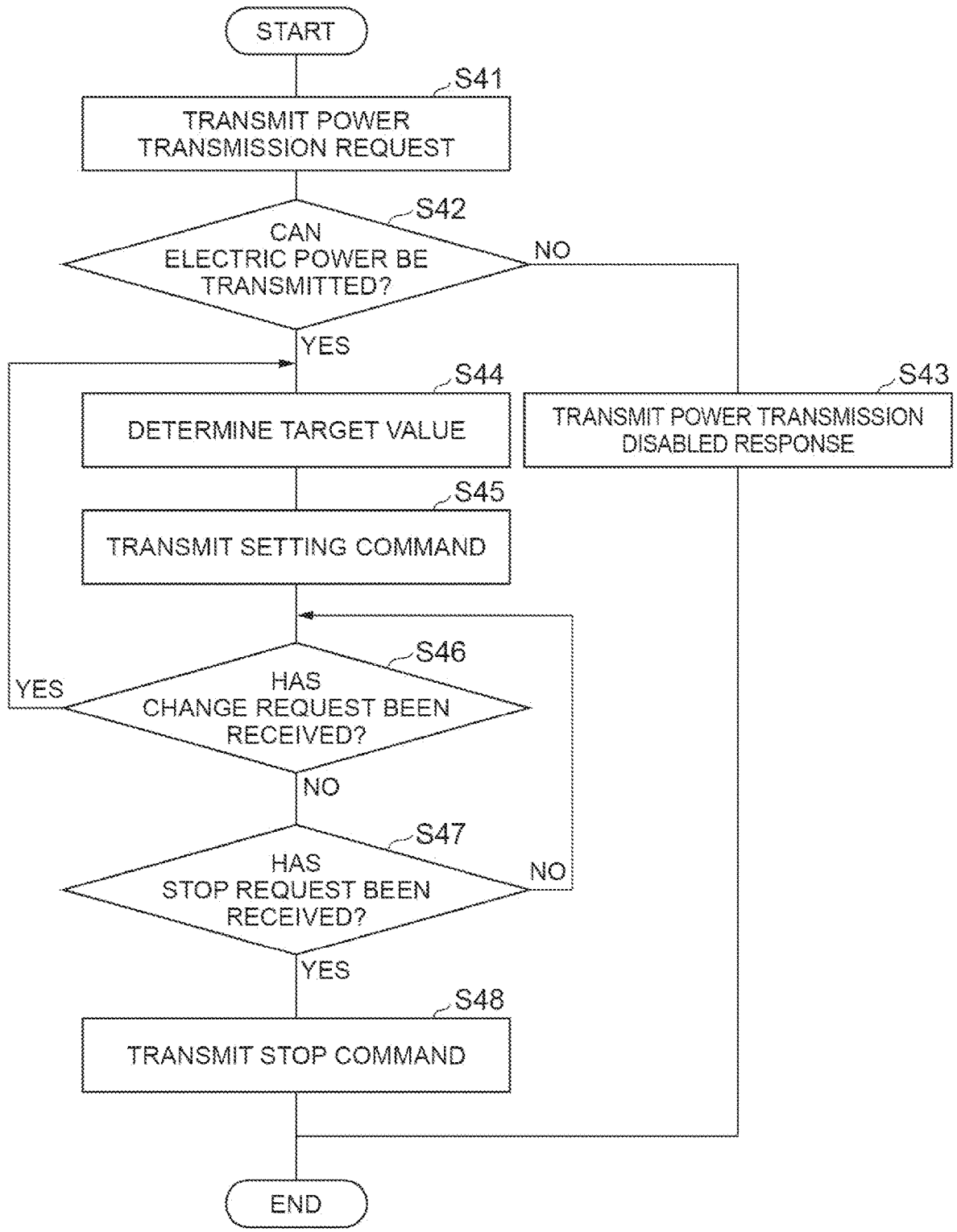
FIG. 11 is a flowchart showing a series of processes of a power management method performed by the upper power management device shown in FIG. 10.

Next, a series of processes of a power management method performed by the upper power management device 3A will be described with reference to FIG. 11. FIG. 11 is a flowchart showing a series of processes of a power management method performed by the upper power management device shown in FIG. 10. In the present embodiment, as in one embodiment, the power feeding system responding to the power transmission request is arranged to start power transmission at the maximum power Wmax. The series of processes shown in FIG. 11 is started in response to the upper power management device 3A receiving a power transmission request. Here, a case where the power feeding system 2A transmits a power transmission request will be described.

As shown in FIG. 11, first, the response unit 31 transmits the power transmission request to the power feeding system 2B (step S41). Then, the response unit 31 receives a power transmission enabled response or a power transmission disabled response as a response to the power transmission request from (the power management device 10 of) the power feeding system 2B.

Subsequently, the response unit 31 determines whether or not the power feeding system 2B can transmit electric power (step S42). Specifically, when the response unit 31 receives the power transmission enabled response from the power feeding system 2B, the response unit 31 determines that the power feeding system 2B can transmit electric power. When the response unit 31 receives the power transmission disabled response from the power feeding system 2B, the response unit 31 determines that the power feeding system 2B cannot transmit electric power. When it is determined in step S42 that the power feeding system 2B cannot transmit electric power (step S42; NO), the response unit 31 transmits the power transmission disabled response to the power feeding system 2A (step S43), and the series of processes shown in FIG. 11 is completed.

On the other hand, when it is determined in step S42 that the power feeding system 2B can transmit electric power (step S42; YES), the determination unit 33 determines the first target value and the second target value (step S44). Specifically, the determination unit 33 selects a combination corresponding to the maximum power Wmax from the combination group in the storage unit 32. Then, the determination unit 33 determines the power reception target value included in the selected combination as the first target value, and determines the power transmission target value included in the selected combination as the second target value.

Subsequently, the output unit 34 transmits a setting command for setting the first target value in the bidirectional DC/DC converter 9 of the power feeding system 2A to the power feeding system 2A, and transmits a setting command for setting the second target value in the bidirectional DC/DC converter 9 of the power feeding system 2B to the power feeding system 2B (step S45).

When (the power management device 10 of) each power feeding system receives the setting command, the target value of the external bus voltage Vbus1 in the bidirectional DC/DC converter 9 of the power feeding system 2A is set to the first target value, and the target value of the external bus voltage Vbus1 in the bidirectional DC/DC converter 9 of the power feeding system 2B is set to the second target value. Accordingly, the power feeding system 2A is set to the power reception mode, and the power feeding system 2B is set to the power transmission mode. Therefore, power transmission is started from the power feeding system 2B to the power feeding system 2A at the maximum power Wmax while minimizing the power transmission loss. That is, power interchange is started between the power feeding system 2A and the power feeding system 2B.

Subsequently, the determination unit 33 determines whether or not the change request has been received (step S46). When a change request occurs in the power feeding system 2A or the power feeding system 2B, (the power management device 10 of) the power feeding system 2A or the power feeding system 2B transmits the transmission power value together with the change request to the upper power management device 3A. Here, the intermediate power Wmid is used as the transmission power value transmitted with the change request.

When the determination unit 33 receives the change request from the power feeding system 2A or the power feeding system 2B (step S46; YES), the determination unit 33 determines the first target value and the second target value corresponding to the intermediate power Wmid (step S44). More specifically, the determination unit 33 selects a combination corresponding to the intermediate power Wmid from the combination group in the storage unit 32. Then, the determination unit 33 determines the power reception target value included in the selected combination as the first target value, and determines the power transmission target value included in the selected combination as the second target value.

Subsequently, the output unit 34 transmits a setting command for setting the first target value in the bidirectional DC/DC converter 9 of the power feeding system 2A to the power feeding system 2A, and transmits a setting command for setting the second target value in the bidirectional DC/DC converter 9 of the power feeding system 2B to the power feeding system 2B (step S45).

When (the power management device 10 of) each power feeding system receives the setting command, the target value of the external bus voltage Vbus1 in the bidirectional DC/DC converter 9 of the power feeding system 2A is set to the first target value, and the target value of the external bus voltage Vbus1 in the bidirectional DC/DC converter 9 of the power feeding system 2B is set to the second target value. Accordingly, electric power is transmitted from the power feeding system 2B to the power feeding system 2A at the intermediate power Wmid while minimizing power transmission loss. Thereafter, when the determination unit 33 further receives the change request, steps S44 to S46 are performed again.

On the other hand, when the determination unit 33 has not received any change request (step S46; NO), the determination unit 33 determines whether or not a stop request has been received (step S47). The stop request may be transmitted from the power feeding system 2A or the power feeding system 2B. When the determination unit 33 has not received any stop request (step S47; NO), step S46 is performed again.

On the other hand, when the determination unit 33 has received a stop request (step S47; YES), the output unit 34 transmits a stop command to the power feeding system 2A and the power feeding system 2B (step S48). Upon receiving the stop command, the power management device 10 of the power feeding system 2A resets the power reception mode of the power feeding system 2A by stopping the bidirectional DC/DC converter 9, and sets the power feeding system 2A to the normal mode. Similarly, when the power management device 10 of the power feeding system 2B receives the stop command, the power management device 10 of the power feeding system 2B resets the power transmission mode of the power feeding system 2B by stopping the bidirectional DC/DC converter 9, and sets the power feeding system 2B to the normal mode.

Thus, the series of processes shown in FIG. 11 is completed.

The same processes are also performed when the power feeding system 2B transmits a power transmission request. This case differs from the case where the power feeding system 2A transmits a power transmission request in the following points. In step S44, the determination unit 33 selects a combination corresponding to the maximum power Wmax from the combination group, determines the power transmission target value included in the selected combination as the first target value, and determines the power reception target value included in the selected combination as the second target value. When the determination unit 33 receives the change request in step S46, the determination unit 33 selects a combination corresponding to the intermediate power Wmid from the combination group in the storage unit 32 in step S44, determines the power transmission target value included in the selected combination as the first target value, and determines the power reception target value included in the selected combination as the second target value.

In the upper power management device 3A described above, when a power transmission request is received from the power feeding system 2A, a combination corresponding to the maximum power Wmax in the power transmission request is selected from the combination group, the power reception target value included in the selected combination is determined as the first target value, and the power transmission target value included in the selected combination is determined as the second target value. Accordingly, the power reception target value at which the power transmission loss at the maximum power Wmax is minimized is set in the bidirectional DC/DC converter 9 of the power feeding system 2A, and the power transmission target value at which the power transmission loss at the maximum power Wmax is minimized is set in the bidirectional DC/DC converter 9 of the power feeding system 2B. Therefore, power transmission loss in power transmission from the power feeding system 2B to the power feeding system 2A can be suppressed. As a result, the power transmission efficiency between the power feeding system 2A and the power feeding system 2B can be improved.

When a power transmission request is received from the power feeding system 2B, the determination unit 33 selects a combination corresponding to the maximum power Wmax in the power transmission request from the combination group, determines the power reception target value included in the selected combination as the second target value, and determines the power transmission target value included in the selected combination as the first target value. According to this configuration, a common combination group is used for the case where electric power is transmitted from the power feeding system 2A to the power feeding system 2B and the case where electric power is transmitted from the power feeding system 2B to the power feeding system 2A. Therefore, since only one combination group is prepared, the configuration of the upper power management device 3A can be simplified.

The power management device, the upper power management device, the power management method, and the power management program according to the present disclosure are not limited to the above-described embodiments.

In the above embodiments, the same combination group (table) is used for the case where electric power is transmitted from the power feeding system 2A to the power feeding system 2B and the case where electric power is transmitted from the power feeding system 2B to the power feeding system 2A. However, when the bidirectional DC/DC converter 9 of the power feeding system 2A has characteristics (input-output characteristics, input impedance, and output impedance) different from those of the bidirectional DC/DC converter 9 of the power feeding system 2B, the combination at which the power transmission loss is minimized when electric power is transmitted from the power feeding system 2A to the power feeding system 2B may be different from the combination at which the power transmission loss is minimized when electric power is transmitted from the power feeding system 2B to the power feeding system 2A.

For example, in one embodiment, the storage unit 12 may further store another combination group (second combination group) different from the combination group. In this case, the combination group includes a plurality of combinations of a power transmission target value and a power reception target value at which power transmission loss is minimized at different transmission power values when electric power is transmitted from the power feeding system 2B to the power feeding system 2A. Another combination group includes a plurality of combinations of a power transmission target value and a power reception target value at which power transmission loss is minimized at different transmission power values when electric power is transmitted from the power feeding system 2A to the power feeding system 2B.

In this modification, when electric power is transmitted from the power feeding system 2B to the power feeding system 2A, the control unit 13 selects a target value from the combination group. On the other hand, when electric power is transmitted from the power feeding system 2A to the power feeding system 2B, the control unit 13 selects a target value from another combination group. For example, when a power transmission request is transmitted from the power feeding system 2A, the control unit 13 of the power feeding system 2A selects a power reception target value corresponding to the transmission power value (for example, maximum power Wmax) in the power transmission request from among the plurality of power reception target values included in the combination group, and the control unit 13 of the power feeding system 2B selects a power transmission target value corresponding to the transmission power value (for example, maximum power Wmax) in the power transmission request from among the plurality of power transmission target values included in the combination group. On the other hand, when a power transmission request is transmitted from the power feeding system 2B, the control unit 13 of the power feeding system 2A selects a power transmission target value corresponding to the transmission power value (for example, maximum power Wmax) in the power transmission request from among the plurality of power transmission target values included in another combination group, and the control unit 13 of the power feeding system 2B selects a power reception target value corresponding to the transmission power value (for example, maximum power Wmax) in the power transmission request from among the plurality of power reception target values included in another combination group.

Similarly, in another embodiment, the storage unit 32 may further store another combination group different from the combination group. In this case, the combination group includes a plurality of combinations of a power transmission target value and a power reception target value at which power transmission loss is minimized at different transmission power values when electric power is transmitted from the power feeding system 2B to the power feeding system 2A. Another combination group includes a plurality of combinations of a power transmission target value and a power reception target value at which power transmission loss is minimized at different transmission power values when electric power is transmitted from the power feeding system 2A to the power feeding system 2B.

In this modification, when electric power is transmitted from the power feeding system 2B to the power feeding system 2A, the determination unit 33 selects a target value from the combination group. On the other hand, when electric power is transmitted from the power feeding system 2A to the power feeding system 2B, the determination unit 33 selects a target value from another combination group. For example, when a power transmission request is received from the power feeding system 2A, the determination unit 33 selects a combination (first combination) corresponding to the transmission power value (for example, maximum power Wmax) in the power transmission request from the combination group, determines the power reception target value included in the selected combination as the first target value, and determines the power transmission target value included in the selected combination as the second target value. On the other hand, when a power transmission request is received from the power feeding system 2B, the determination unit 33 selects a combination (second combination) corresponding to the transmission power value (for example, maximum power Wmax) in the power transmission request from another combination group, determines the power reception target value included in the selected combination as the second target value, and determines the power transmission target value included in the selected combination as the first target value.

According to these configurations, the combination group used for the case where electric power is transmitted from the power feeding system 2A to the power feeding system 2B is different from the combination group used for the case where electric power is transmitted from the power feeding system 2B to the power feeding system 2A.

Therefore, for example, even when the characteristics of the bidirectional DC/DC converter 9 of the power feeding system 2A are different from those of the bidirectional DC/DC converter 9 of the power feeding system 2B, the power transmission loss can be suppressed and the power transmission efficiency can be improved.

In the above embodiments and the modifications thereof, the transmission power value in the power transmission request is not necessarily limited to the maximum power Wmax, and may be any one of the transmission power values stored in the storage unit 12 or 32. Similarly, the transmission power value in the change request is not necessarily limited to the intermediate power Wmid, and may be any one of the transmission power values stored in the storage unit 12 or 32. For example, the power management device 10 of each power feeding system may transmit a desired transmission power value together with a power transmission request or a change request.

At least one of the power conditioner 52, the AC/DC converter 62, the converters 7, the bidirectional DC/DC converters 83, and the bidirectional DC/DC converter 9 may not have the power measurement function. In this case, the power management device 10 may acquire the measured value of each electric power from the measured value of the voltage measured by the voltage sensor and the measured value of the electric current measured by the current sensor.

The power supply device 5 may include another power generation device in place of the renewable energy power generation device 51.

The auxiliary power supply device 6 may include a power generation device in place of the commercial power supply 61. An example of the power generation device is a diesel generator. In this case, the number of the auxiliary power supply devices 6 is not limited to one, and may be appropriately changed as necessary. When the auxiliary power supply device 6 does not include the commercial power supply 61, the power feeding systems 2A and 2B are also referred to as independent DC power feeding systems. The auxiliary power supply device 6 may be used only when the power feeding systems 2A and 2B are started up. For example, when an electric power shortage occurs in the power feeding system 2A, the power feeding system 2A may first receive electric power from the power feeding system 2B, and then may receive electric power from the auxiliary power supply device 6 when electric power cannot be received from the power feeding system 2B.

In the above-described embodiments and modifications thereof, each of the power conditioner 52, the AC/DC converter 62, the converters 7, the bidirectional DC/DC converters 83, and the bidirectional DC/DC converter 9 operates with a DC voltage generated inside the device. Alternatively, each of the power feeding systems 2A and 2B may include a power supply unit, which generates a DC voltage having a constant voltage value from the internal bus voltage Vbus2 (first internal bus voltage, second internal bus voltage) of the internal DC bus B2 (first internal DC bus, second internal DC bus), and supplies the DC voltage (electric power) to each device.

The power feeding system 2A may not include the renewable energy power generation device 51. In this case, the renewable energy power generation device 51 provided outside the power feeding system 2A may be connected to the internal DC bus B2 via the power conditioner 52 included in the power feeding system 2A.

The power feeding system 2A may not include the commercial power supply 61. In this case, the commercial power supply 61 provided outside the power feeding system 2A may be connected to the internal DC bus B2 via the AC/DC converter 62 included in the power feeding system 2A.

What is claimed is:

1. A power management device comprising:
an acquisition unit configured to acquire an amount of stored electric power of a first power feeding system connected to a second power feeding system via an external direct current (DC) bus;
a control unit configured to switch an operation mode of the first power feeding system by controlling a converter, the converter being capable of bidirectionally converting between an external bus voltage supplied to the external DC bus and an internal bus voltage supplied to an internal DC bus for supplying DC electric power in the first power feeding system; and
a storage unit configured to store a plurality of power reception target values which are target values of the external bus voltage in the converter when electric power is transmitted from the second power feeding system to the first power feeding system and a plurality of power transmission target values which are target values of the external bus voltage in the converter when electric power is transmitted from the first power feeding system to the second power feeding system,
wherein the plurality of power reception target values are target values at which power transmission loss is minimized at different transmission power values,
wherein the plurality of power transmission target values are target values at which power transmission loss is minimized at different transmission power values,
wherein when the amount of stored electric power is less than a first storage threshold value, the control unit transmits a first power transmission request to an upper power management device that manages power transmission and reception between the first power feeding system and the second power feeding system, selects a first power reception target value corresponding to a first transmission power value in the first power transmission request from among the plurality of power reception target values, and sets the first power feeding system to a power reception mode by setting a target value of the external bus voltage to the first power reception target value, and
wherein when the amount of stored electric power exceeds a second storage threshold value that is larger than the first storage threshold value and the control unit receives a second power transmission request from the second power feeding system via the upper power management device, the control unit selects a first power transmission target value corresponding to a second transmission power value in the second power transmission request from among the plurality of power transmission target values, and sets the first power feeding system to a power transmission mode by setting the target value of the external bus voltage to the first power transmission target value.

2. The power management device according to claim 1, wherein the control unit selects a second power reception target value corresponding to a third transmission power value from among the plurality of power reception target values in response to a change request for changing the first transmission power value to the third transmission power value occurring in a state in which the first power feeding system is set to the power reception mode, and sets the target value of the external bus voltage to the second power reception target value.

3. The power management device according to claim 1, wherein the control unit selects a second power transmission target value corresponding to a fourth transmission power value from among the plurality of power transmission target values in response to a change request for changing the second transmission power value to the fourth transmission power value occurring in a state in which the first power feeding system is set to the power transmission mode, and sets the target value of the external bus voltage to the second power transmission target value.

4. The power management device according to claim 1, wherein the control unit resets the power reception mode in response to the amount of stored electric power exceeding a first stop threshold value that is smaller than the second storage threshold value and larger than the first storage threshold value in a state in which the first power feeding system is set to the power reception mode.

5. The power management device according to claim 1, wherein the control unit resets the power transmission mode in response to the amount of stored electric power being less than a second stop threshold value that is smaller than the second storage threshold value and larger than the first storage threshold value in a state in which the first power feeding system is set to the power transmission mode.

6. An upper power management device that controls power transmission and reception between a first power feeding system and a second power feeding system that transmit and receive electric power to and from each other via an external DC bus, the upper power management device comprising:
a determination unit configured to determine a first target value of an external bus voltage, which is supplied to the external DC bus, in a first converter and a second target value of the external bus voltage in a second converter, the first converter being capable of bidirectionally converting between the external bus voltage and a first internal bus voltage supplied to a first internal DC bus for supplying DC electric power in the first power feeding system, the second converter being capable of bidirectionally converting between the external bus voltage and a second internal bus voltage supplied to a second internal DC bus for supplying DC electric power in the second power feeding system;
an output unit configured to output a first setting command for setting the first target value in the first converter and a second setting command for setting the second target value in the second converter; and
a storage unit configured to store a first combination group including a plurality of combinations of a power transmission target value and a power reception target value at which power transmission loss is minimized at different transmission power values,
wherein when the determination unit receives a first power transmission request from the first power feeding system, the determination unit selects a first combination corresponding to a first transmission power value in the first power transmission request from the first combination group, determines a power reception target value included in the first combination as the first target value, and determines a power transmission target value included in the first combination as the second target value.

7. The upper power management device according to claim 6,
wherein when the determination unit receives a second power transmission request from the second power feeding system, the determination unit selects a second combination corresponding to a second transmission power value in the second power transmission request from the first combination group, determines a power reception target value included in the second combination as the second target value, and determines a power transmission target value included in the second combination as the first target value.

8. The upper power management device according to claim 6,
wherein the first combination group includes a plurality of combinations of a power transmission target value and a power reception target value at which power transmission loss is minimized at different transmission power values when electric power is transmitted from the second power feeding system to the first power feeding system,
wherein the storage unit further stores a second combination group including a plurality of combinations of a power transmission target value and a power reception target value at which power transmission loss is minimized at different transmission power values when electric power is transmitted from the first power feeding system to the second power feeding system, and
wherein when the determination unit receives a second power transmission request from the second power feeding system, the determination unit selects a second combination corresponding to a second transmission power value in the second power transmission request from the second combination group, determines a power reception target value included in the second combination as the second target value, and determines a power transmission target value included in the second combination as the first target value.

9. A power management method comprising:
acquiring an amount of stored electric power of a first power feeding system connected to a second power feeding system via an external DC bus;
transmitting a first power transmission request to an upper power management device that manages power transmission and reception between the first power feeding system and the second power feeding system when the amount of stored electric power is less than a first storage threshold value;
setting the first power feeding system to a power reception mode when the amount of stored electric power is less than the first storage threshold value; and setting the first power feeding system to a power transmission mode when the amount of stored electric power exceeds a second storage threshold value that is larger than the first storage threshold value and a second power transmission request is received from the second power feeding system via the upper power management device,
wherein in setting the first power feeding system to the power reception mode, a first power reception target value corresponding to a first transmission power value in the first power transmission request is selected from among a plurality of power reception target values, and the first power feeding system is set to the power reception mode by setting a target value of an external bus voltage, which is supplied to the external DC bus, in a converter that is capable of bidirectionally converting between the external bus voltage and an internal bus voltage supplied to an internal DC bus for supplying DC electric power in the first power feeding system to the first power reception target value,
wherein in setting the first power feeding system to the power transmission mode, a first power transmission target value corresponding to a second transmission power value in the second power transmission request is selected from among a plurality of power transmission target values, and the first power feeding system is set to the power transmission mode by setting the target value of the external bus voltage in the converter to the first power transmission target value,
wherein the plurality of power reception target values are target values of the external bus voltage in the converter when electric power is transmitted from the second power feeding system to the first power feeding system, and are target values at which power transmission loss is minimized at different transmission power values, and
wherein the plurality of power transmission target values are target values of the external bus voltage in the converter when electric power is transmitted from the first power feeding system to the second power feeding system, and are target values at which power transmission loss is minimized at different transmission power values.

* * * * *